(12) United States Patent
Utsunomiya

(10) Patent No.: US 8,127,886 B2
(45) Date of Patent: Mar. 6, 2012

(54) NOISE SUPPRESSOR, ELECTRONIC APPARATUS, AND NOISE SUPPRESSION CHARACTERISTIC CONTROL METHOD

(75) Inventor: Motoyasu Utsunomiya, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 13/064,595

(22) Filed: Apr. 1, 2011

(65) Prior Publication Data

US 2011/0232992 A1 Sep. 29, 2011

Related U.S. Application Data

(62) Division of application No. 11/806,431, filed on May 31, 2007, now Pat. No. 7,942,234.

(30) Foreign Application Priority Data

Aug. 29, 2006 (JP) .................... 2006-232166

(51) Int. Cl.
*F01N 13/00* (2010.01)
(52) U.S. Cl. ........ 181/225; 181/214; 181/210; 415/119; 381/71.5
(58) Field of Classification Search .................. 181/225, 181/214, 230; 415/119; 381/71.5
See application file for complete search history.

(56) References Cited

U.S. PATENT DOCUMENTS

| | | | |
|---|---|---|---|
| 4,150,313 A | 4/1979 | Panza | |
| 4,279,325 A | 7/1981 | Challis | |
| 5,959,265 A | 9/1999 | Van Ligten | |
| 6,104,608 A | 8/2000 | Casinelli et al. | |
| 7,230,827 B2 | 6/2007 | Sun et al. | |
| 7,314,113 B2 | 1/2008 | Doll | |
| 7,431,127 B2 | 10/2008 | de Borchgrave et al. | |
| 7,546,898 B2 | 6/2009 | Tracy et al. | |
| 2003/0141144 A1 | 7/2003 | Wilson | |
| 2005/0161280 A1 | 7/2005 | Furuya | |

FOREIGN PATENT DOCUMENTS

| | | |
|---|---|---|
| JP | 62-12197 | 1/1987 |
| JP | 63-125639 | 5/1988 |
| JP | 63-153592 | 6/1988 |

(Continued)

OTHER PUBLICATIONS

Chinese Ofice Action dated Feb. 12, 2010 (with English translation).

(Continued)

*Primary Examiner* — Forrest M Phillips
(74) *Attorney, Agent, or Firm* — McGinn IP Law Group, PLLC

(57) ABSTRACT

A noise suppression characteristics adjustment method includes adjusting noise suppression characteristics of a noise suppressor, which includes a muffler having a reflection plate for reflecting sound from the cooling fan, the reflection plate being provided at a position in the cooling duct confronting an intake plane of the cooling fan and formed substantially parallel to the intake plane. A sound-absorbing part of the muffler is provided on the reflection plate. A distance d between the reflection plate and the intake plane is set such that $d<c/(2\times f)$ where f is a sound-absorption frequency of the muffler and c is a speed of sound. The muffler is located inside the cooling duct. A through-hole is provided in the reflection plate. The through hole includes a plurality of through-holes. A resonance frequency of the resonator sound absorber is adjusted by blocking at least one of the plurality of through-holes.

10 Claims, 36 Drawing Sheets

FOREIGN PATENT DOCUMENTS

| | | |
|---|---|---|
| JP | 63-195398 | 12/1988 |
| JP | 2-42494 | 3/1990 |
| JP | 6-81895 | 10/1994 |
| JP | 6-282278 | 10/1994 |
| JP | 10-091288 | 4/1998 |
| JP | 10-91288 | 4/1998 |
| JP | 2001-65077 | 3/2001 |
| JP | 2001-68882 | 3/2001 |
| JP | 2001-92468 | 4/2001 |
| JP | 2001-222065 | 8/2001 |
| JP | 3488687 | 10/2003 |
| JP | 3532813 | 3/2004 |
| JP | 2005-30308 | 2/2005 |
| JP | 3656573 | 3/2005 |
| JP | 2005-227533 | 8/2005 |
| JP | 2000-99034 | 4/2009 |
| WO | WO 2005/024778 A1 | 3/2005 |

OTHER PUBLICATIONS

Japanese Office Action dated Jul. 30, 2008 (including partial English translation).

Sone, Akira, and three others, "Passive control of broadcast sound using reflection boards," The JapanSociety of Mechanical Engineers, compilation of lectures from the Measurement Control Division, Japan, 2001, Pt. 1, 163-168.

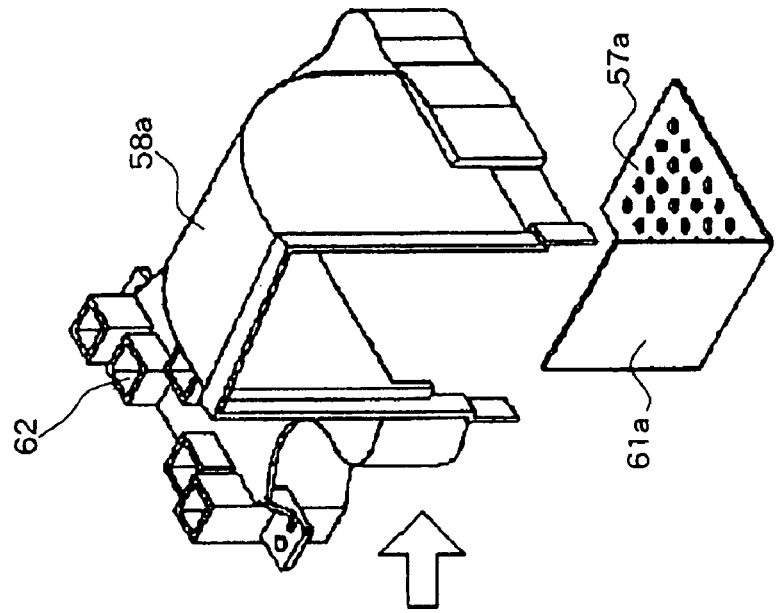
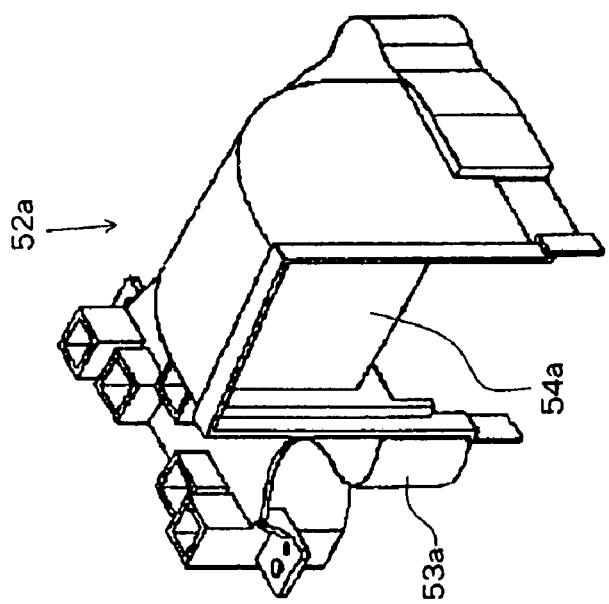
Fig. 17(a)
Fig. 17(b)

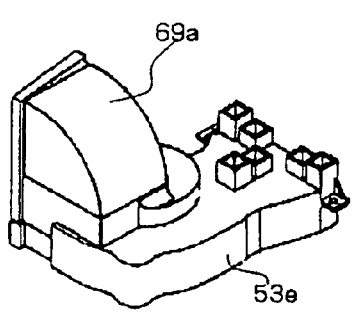 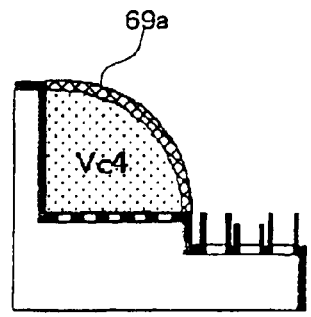
Fig. 25(a)  Fig. 25(b)
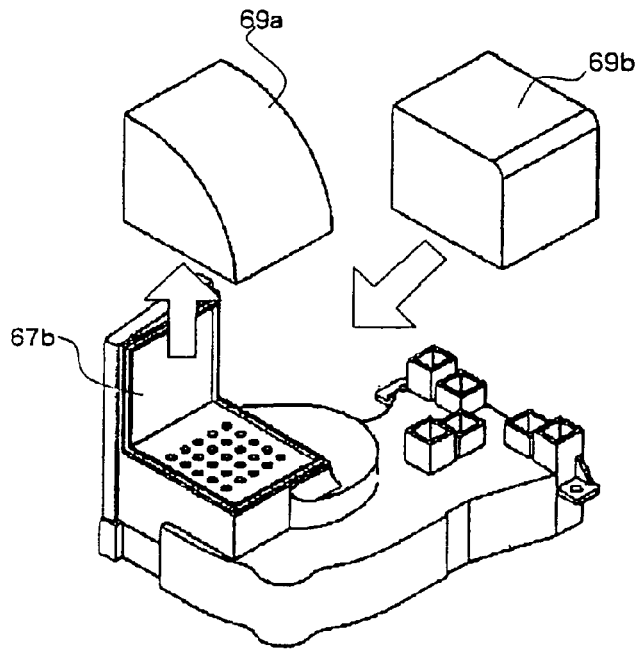
Fig. 25(c)
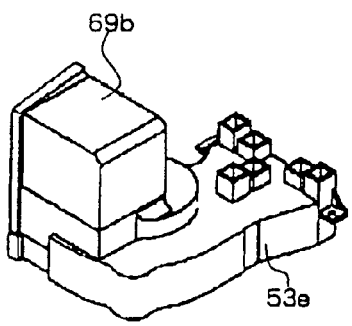 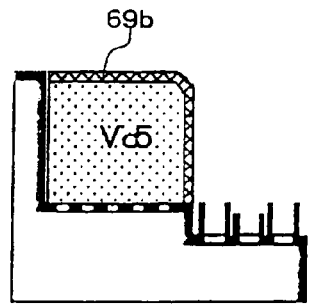
Fig. 25(d)  Fig. 25(e)

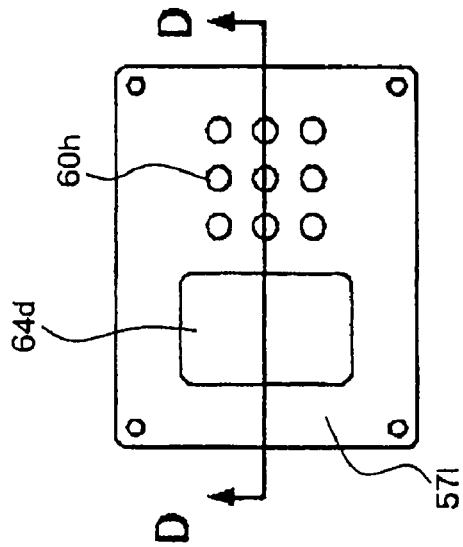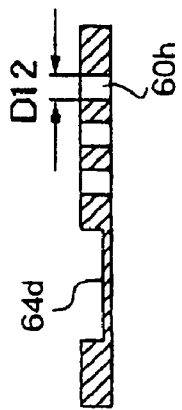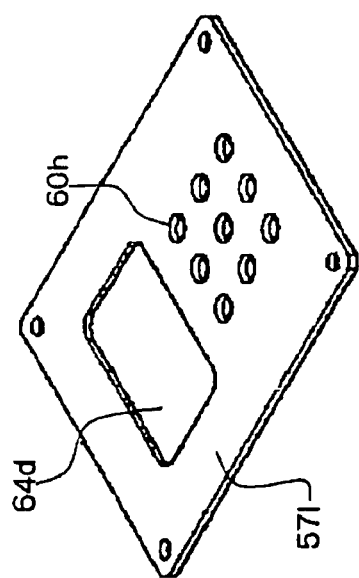
Fig. 35 (b)
Fig. 35 (c)
Fig. 35 (a)

NOISE SUPPRESSOR, ELECTRONIC APPARATUS, AND NOISE SUPPRESSION CHARACTERISTIC CONTROL METHOD

The present application is a Divisional Application of U.S. patent application Ser. No. 11/806,431, filed on May 31, 2007 now U.S. Pat. No. 7,942,234, which is based on and claims priority from Japanese patent application No. 2006-232166, filed on Aug. 29, 2006, the entire contents of which are incorporated herein by reference.

BACKGROUND OF THE INVENTION

1. Field of the Invention

The present invention relates to a noise suppressor used in an apparatus having a cooling fan and a cooling duct, to an electronic apparatus provided with a noise suppressor, and to a method of effectively controlling the noise suppression characteristics of these devices, and more particularly, relates to a noise suppressor and method for effectively suppressing the noise of a cooling fan used in a projection display device such as a liquid crystal projector.

2. Description of the Related Art

Projection display devices that enlarge and project upon a screen images generated on image display elements are becoming widely used not only in the workplace but also in typical homes. Among such projection display devices, a liquid crystal projector that employs a liquid crystal panel as the image display element displays an image on a screen as described herein after.

White light that is emitted from a light source is reflected by a reflector and then undergoes polarization conversion, and further, separation into each of the colors R, G, and B. Each of the separated colors is irradiated onto a corresponding liquid crystal panel in which each of the colors is subjected to light modulation according to a video signal by means of the corresponding liquid crystal panel. The light of each of the colors that has undergone light modulation is then synthesized in a color-synthesizing prism and projected onto a screen by way of optical system for projection.

When a TN (Twisted Nematic) liquid crystal panel is used as the liquid crystal panel, the TN liquid crystal panel can handle only specific linearly polarized light components, and the direction of polarization of the light of each color is therefore aligned in a prescribed direction of polarization (P-polarization) at a polarizer film (for example, a P-polarizer film) on the side of light incidence. The P-polarization component of the light that has undergone light modulation by the liquid crystal panel is then cut by a polarizer film (S-polarizer film) on the side of light emission that differs from the polarizer film on the side of light incidence, whereby only the S-polarization component is extracted.

In a light modulation module of the above-described configuration, an incident-side polarizer film and an emission-side polarizer film that are disposed before and after the liquid crystal panel and that together with the liquid crystal panel make up the liquid crystal unit pass, only polarize light of one axial direction and block other polarized light. The incident-side sheet polarizer and emission-side sheet polarizer are, therefore, prone to heating that results from light absorption.

In addition, a black matrix is provided at each pixel boundary of a liquid crystal panel, and the blockage of transmitted light in this black matrix generates heat to which the liquid crystal panel adds heat generated during its operation.

Organic materials are frequently employed for the liquid crystal panel and sheet polarizes. When irradiated by light of ultraviolet light (UV) and exposed to high temperatures over long periods of operation, the performance of these components suffers considerable deterioration such as damage to the panel alignment layer and loss of the polarization selection characteristic. These light modulation modules therefore call for heat countermeasures such as forced-air cooling.

FIG. 1(a) shows the external appearance of typical liquid crystal projector 1a, and FIG. 1(b) shows the internal configuration of liquid crystal projector 1a. FIG. 2 gives a schematic representation of an example of the internal configuration of liquid crystal projector 1a.

As shown in FIG. 2, first sirocco fan 3 and first cooling duct 4 for effecting forced-air cooling of light modulation module 2a and second sirocco fan 6 and second cooling duct 7 for effecting forced-air cooling of lamp bulb 5 are installed in the enclosure of liquid crystal projector 1a. In addition, an exhaust fan (not shown) is sometimes further provided for exhausting air that has been heated to a high temperature within the enclosure to the outside. In addition to these components, a fan for cooling power supply unit 9 is sometimes provided according to necessity.

Explanation here regards the configuration for cooling the light modulation module of a typical liquid crystal projector using FIG. 3 and FIG. 4. In FIG. 3(a), the optics engine components of the liquid crystal projector in FIG. 1(b) are extracted, and FIG. 3(b) shows an exploded view of the cooling system of this light modulation module 2a.

The cooling module of light modulation module 2a in FIG. 3(b) is made up from first sirocco fan 3 and first cooling duct 4, and as shown in the sectional view of FIG. 4, forced-air cooling is realized by passing cooling air 16 from first sirocco fan 3 by way of duct exhaust ports 12 provided in first cooling duct 4 from the lower end of light modulation module 2a and through each of the R/B/G liquid crystal units (incident-side sheet polarizer 13/liquid crystal panel 14/emission-side sheet polarizer 15).

Recent years have seen growing demand for liquid crystal projectors having sizes that are more compact and higher brightness. Increase of lamp output and downsizing of the display device have accelerated to meet these demands, and as a result, the luminous flux density of light that is irradiated into image display elements (the liquid crystal unit) is increasing and the heat load upon the device is steadily rising.

For example, in a liquid crystal projector of the 2000 lm class, the total heat generation is in the range of 15 W and the heat flux of the emission-side sheet polarizer is 0.6 W/cm$^2$. In the 5000 lm class, however, the total heat generation of the liquid crystal unit rises to 35 W or more, and the heat flux of the emission-side sheet polarizer reaches 1.4 W/cm$^2$ or more.

When the forced-air cooling method is adopted for cooling, the increased heat load is dealt with by increasing the amount of air from the fan and raising the wind velocity around the source of heat generation to raise the efficiency of heat transfer and improve cooling performance.

However, attempting to increase air flow by raising the fan revolutions leads to increased operation noise. To address this problem, quieter operation is attempted by using a larger fan at lower revolutions or by employing ventilation ducts having a high sound-deadening effect.

FIGS. 5(a) and 5(b) show perspective and sectional views of the construction of a prior-art example of a lined duct dissipative muffler. This lined duct dissipative muffler 17 includes ventilation duct 19a provided with fan 18 at one longitudinal end, and porous sound-absorbing material 20a such as glass wool that lines the inner surface of the duct. Sound that is propagated through ventilation duct 19a enters the medium (porous sound-absorbing material 20a) and is damped by the viscous damping of the aerial vibration within the fiber material and the conversion from sound energy to heat energy caused by movement of the fibers.

FIG. 6 shows an example of a lined elbow dissipative muffler of the prior art. This lined elbow dissipative muffler 22 includes bent duct 23 provided with fan 18 at one end and porous sound-absorbing material 20b that lines the inside of bent duct 23. This type of dissipative muffler can obtain both a sound reduction effect due to the phase interference between incident waves and reflected waves at the bent portion of bent duct 23 and a sound-reduction effect due to the porous sound-absorbing material for sound that is dispersed at the bent portion.

JP-A-2001-68882 discloses a projector device that is provided with the above-described lined elbow dissipative muffler. More specifically, a projector is disclosed that is provided with bent intake and exhaust ducts in which porous sound-absorbing material lines the inner surfaces.

FIG. 7 shows an example of an active noise control (ANC) muffler of the prior art. This active muffler 24 includes detection microphone 25, controller 26, amplifier 27, speaker 28, and error microphone 29.

Detection microphone 25 supplies a signal according to noise in ventilation duct 19b, and controller 26 analyzes the signal supplied from detection microphone 25 and generates a signal of the opposite phase of this signal.

Amplifier 27 amplifies the signal generated by controller 26, and speaker 28 generates sound according to the signal that has been amplified by amplifier 27. Error microphone 29 verifies whether the noise (sound waves) in the duct and the sound (sound waves) generated by the speaker cancel each other out and feeds back the result to controller 26.

As will be clear from the foregoing explanation, this type of noise suppressor uses sound wave interference produced by a secondary sound source to damp noise. JP-A-06-282278 discloses an example of the same type of noise suppressor, i.e., an active noise suppressor that eliminates the noise of a standing wave generated in a duct. In addition, several examples have been reported that use resonator mufflers that employ Helmholtz resonators to suppress sound.

JP-A-2001-92468 discloses a sound insulation wall and a method of designing a sound insulation wall.

In this sound insulation wall, a sound insulation wall main body is composed of a pair of planar main walls that confront each other over a spacing and sub-walls that join the outer peripheries of the two main walls and form an interior space between the two main walls, and tubes that pass through the two main walls and that form air passages are provided at substantially uniform spacing between the two main walls.

Communicating holes are provided in these tubes that allow the air passages to communicate with the interior space. When designing this sound insulation wall, the volume of the interior space and the number of air passages are determined in accordance with the relation equation between the central frequency of noise and the speed of sound so as to raise the sound attenuation effect in the Helmholtz resonator formed by the communicating holes and the back space of the air passages.

The following explanation is regarding the sound absorbing action and resonation principles of a Helmholtz resonator. FIG. 8 is a schematic view of the basic configuration of a Helmholtz resonator.

Helmholtz resonator 30 has a construction in which cavity portion 31 having a large volume VO is provided with small neck portion 32. When sound (noise) of a frequency that matches the resonance frequency of the air spring vibration of this construction passes through neck portion 32 and reaches cavity portion 31, a resonance phenomenon occurs by which the air of neck portion 32 vibrates violently, converting a portion of the sound energy to heat energy by viscous loss and producing a sound-absorbing effect.

As a sound-absorbing construction that uses the above-described Helmholtz resonance principle, a perforated plate construction with a back air layer such as shown in FIG. 9 is well known.

In perforated plate construction 33 shown in FIG. 9, perforated plate 35 having a large number of through-holes 34 is secured to spacing walls 90 separated by a distance $L_1$ from wall surface 83. Cavity volume $V_1$ is formed between this perforated plate 35 and wall surface 83 and, together with through-holes 34 in perforated plate 35, forms a Helmholtz resonator. The chief factors that determine the sound-absorbing characteristics of the perforated plate construction in this case include the specifications of the perforated plate (plate thickness, diameter of through-holes, and hole pitch) and conditions of use (thickness of the back air layer and foundation conditions), and the material of the plate has no effect on the sound-absorbing characteristic.

Of each of the previously described factors, the specifications of perforated plate 35 and the thickness $L_1$ of the back air layer relate to the resonance frequency at which the sound-absorption coefficient reaches a maximum, and the foundation material relates to the magnitude of the sound-absorption coefficient. The foundation material described here is the porous material (glass wool or felt) that is applied to the back-space layer side of perforated plate 35. If the thickness of the back space layer is no greater than 500 mm, the resonance frequency $f_r$ that determines the main sound-absorption region is calculated by the following equation:

$$f_r = \frac{c}{2\pi} \sqrt{\frac{P}{(t_1 + 0.8 d_1) \times L_1}} \tag{1}$$

where $f_r$ is the resonance frequency (Hz), c is the speed of sound in air (m/s), P is the open area ratio, $t_1$ is the plate thickness (m), $d_1$ is the diameter of through-holes (m), and $L_1$ is the thickness of the back air layer (m).

As another example in which a Helmholtz resonator is applied as a muffler, a construction is also known in which, as shown in FIG. 10, a portion of a duct is formed as a duplex tube, inner passage tube 37 provided with a plurality of through-holes 39a and outer closed pipe 38 together forming perforated-pipe resonator muffler 36.

JP-A-2001-222065 discloses an example that aims for a sound-absorbing effect by arranging the above-described perforated pipe resonator muffler in a ventilation duct. FIG. 11 shows the schematic configuration of the resonator muffler in a duct for cooling a liquid crystal panel of the projector disclosed in JP-A-2001-222065.

As shown in FIG. 11, JP-A-2001-222065 discloses a first resonator muffler 43 composed of first resonance chamber 41 and through-holes 39b and second resonator muffler 44 composed of second resonation chamber 42 and through-holes 39c, which are constructed in both the air-intake side and air-output side of liquid crystal panel cooling duct 40. The operation noise of cooling fan 45 that occurs inside liquid crystal panel cooling duct 40 is damped by the resonance phenomenon of resonator mufflers 43 and 44 to suppress the sound.

In addition, JP-A-2005-30308 discloses a method for variable control of the sound-absorption frequency of a Helmholtz resonator provided in an intake duct. FIGS. 12(a) and 12(b) show the schematic configuration of the resonator noise suppressor in the intake duct disclosed in JP-A-2005-30308. As shown in FIGS. 12(a) and 12(b), JP-A-2005-30308 discloses a branch pipe 86 which is provided midway through duct 85 which is the intake/exhaust passage, and thus provides a connection to resonance box 87, and mechanically rotating fan-shaped movable plate 88 provided in the neck portion enables continuous variation of the area of the profile of the neck portion and control for obtaining any resonance frequency.

SUMMARY OF THE INVENTION

In view of the foregoing and other problems, disadvantages, and drawbacks of the related art, a purpose of the exemplary aspects of the present invention is to provide a noise suppressor of compact and inexpensive construction for effectively reducing fan noise and an electronic apparatus provided with this noise suppressor, and further, to provide a method that enables easy adjustment of the noise suppression characteristic.

The present invention may achieve quieter operation than related art noise suppressors by using a large fan that operates at low revolutions results in an increase in the installation volume of the fan and interferes with miniaturization of the device.

For example, JP-A-2001-68882 discloses a noise suppressor configuration in which sound-absorbing material lines a bent duct for air passage. However, when attempting sound absorption by lining the duct interior with sound-absorbing material composed of a porous material (such as glass wool), the thickness of the sound-absorbing material must be made at least 10 mm-30 mm to obtain an adequate noise suppression effect for the range of mid- to high-pitched sounds (1 kHz-5 kHz). Securing area for the passage of air in the duct therefore becomes problematic, and the problem occurs in some cases that the duct itself becomes large. In addition, the demand in recent years for downsizing of the projector device is reflected in high-density packaging, and as can be seen in the internal configuration of the projector shown in FIG. 1(b), virtually no surplus exists for providing extra space for the intake/exhaust ducts.

When sound-absorbing material is applied on the side of the intake duct, for example, in the cooling of a liquid crystal unit, air that has passed through an intake filter passes into a duct. Bits of fiber that are produced by the deterioration of polymer materials over the years of use raise the problem that the liquid crystal unit is directly exposed to dust and attendant concern of deterioration of image quality and device reliability.

In JP-A-H06-282278, an active noise suppressor is disclosed in which an active noise control system is applied in the exhaust duct to attenuate fan noise by means of sound wave interference. This active noise suppression system obtains a high attenuation effect for low-frequency sounds of 250 Hz or less but does not obtain an adequate noise suppression effect for noise in the range of mid- to high-pitched sounds (1 kHz-5 kHz). Additional problems include the severe constraints on the environment in which the speaker and microphones are used (high temperature, humidity and corrosion inside the ducts) and the high cost of the system itself.

JP-A-2001-92468 discloses a sound insulation wall and a method for designing a sound insulation wall that employs a Helmholtz resonator formed by through-holes and the back air space of air passages to augment the noise-damping effect. The resonator sound-absorbing construction itself has been long used in the noise-blocking walls of residential building materials. This type of sound-absorbing resonator uses the conversion of energy (conversion from vibration energy to heat energy) that results from aerial resonance to attenuate sound. The problem therefore occurs that although this sound-absorbing resonator is capable of exhibiting a comparatively high sound-absorbing effect by means of a compact size for noise in the region of high-pitched sounds, it cannot obtain an adequate attenuation effect for noises in the range of low-pitched sounds if a large volume of cavity space is not provided.

JP-A-2001-222065 discloses a construction in which perforated-tube resonator mufflers are arranged before and after the cooling fan in the ducts of a liquid crystal projector. A configuration for reducing operation noise by providing resonators midway in a ventilation duct in this way is widely used in, for example, automobile resonators. In this configuration, the neck portion of the resonator (point at which noise enters) is orthogonal with respect to the traveling wave of noise from the sound source (the cooling fan), and as a result, the efficiency of introducing the aerial vibration (compressional waves of sound) to the resonator is low and adequate sound absorbing effect is not obtained. The resonator size must therefore be increased to raise the sound-absorbing coefficient and ensure the required noise suppression performance, but this solution necessarily raises problems regarding the package volume and interferes with the realization of a more compact device.

In addition, JP-A-2005-30308 discloses a method for continuously varying the area of the profile of a neck section to control the sound-absorbing frequency, but this case has the drawback that the mechanical construction for rotating the fan-shaped movable plate is complex, leading to an increase in both volume and cost.

The noise suppressor of the present invention, on the other hand, may include a noise suppressor of an apparatus having a cooling fan and a cooling duct and includes a muffler and a reflection plate for reflecting sound from the cooling fan. The reflection plate may be provided at a position in the cooling duct that confronts the intake plane of the cooling fan and may be formed substantially parallel to the intake plane. Further, a sound-absorbing part of the muffler may be provided on the reflection plate and the distance d between the reflection plate and intake plane may be set such that $d<c/(2\times f)$ where f is the sound-absorption frequency of the muffler and c is the speed of sound.

This configuration therefore may be characterized by setting the distance between the intake plane of the cooling fan and the sound-absorbing plane of the muffler within a near field (e.g., the area in which the acoustic power attenuates exponentially with increasing distance from the sound source), forming a mode wherein the radiation of fan noise may be localized in the vicinity of the sound source without being transmitted to free fields as a traveling wave along the sound-absorbing surface.

Exemplary conditions regarding the distance between the fan intake plane and the sound-absorbing surface of the muffler in the duct are next described in detail using FIG. 13.

As also described in the reference document "Passive control of sound radiated by a reflection plate" by Sone Akira et. al in CD-ROM 307 (Tokyo, Aug. 6-9, 2001) of collected papers of Dynamics and Design Conference 2001 of the Japan Society of Mechanical Engineers, when secondary sound source (reflection plate) 47 having length 2b is arranged parallel to and confronting primary sound source 46 having a length 2a and at a position separated by distance d from primary sound source 46, the sound that is emitted into open space between the primary and secondary sound sources may produce a mode in the direction perpendicular to the walls, but this mode may be divided according to frequency between a mode in which sound is propagated as a traveling wave along the wall and a mode in which sound is not propagated far and is localized in the vicinity of the sound source.

The latter of these two modes may form a near field in which sound attenuates exponentially with increasing distance from the sound source. If d is the distance from primary sound source 46 to the reflection plate, which may be the secondary sound source 47, the frequency must be higher than the cut-off frequency (critical frequency) k×d=n×π (where k is the wave number) in order for the $n^{th}$ mode vibration to be transmitted as wave motion, and in the range k×d<π, n=0, i.e., wave motion occurs only in a mode of uniform distribution in a direction perpendicular to the walls.

In other modes, standing waves may be formed without motion in the vicinity of the sound source and the transmission of energy does not occur. That is, because this approaches a sound field in which the sound source surface is closed, the component of the sound pressures of the sound source surface that has the same phase as the particle velocity decreases and the radiated power may be reduced.

Accordingly, if the value of k×d at the target frequency (noise suppression frequency) is adjusted over the range from 0 to Π, the effect of suppressing radiated noise may be obtained in the vicinity of the target frequency.

The wave number is:

$$k = \frac{2\pi}{\lambda} = \frac{2\pi \times f}{c} \qquad (2)$$

where k is the wave number, c is the speed of sound (m/s), λ is the wavelength of sound (m), and f is the frequency of sound (Hz). As a result, the conditions at which the above-described effect of suppressing radiated sound is obtained (k×d<π) can be written as in the next equation when the target frequency is f:

$$d < \frac{c}{2 \times f} \qquad (3)$$

where d is distance (m).

That is, when the frequency of fan noise that is desired to be reduce d is the target frequency (f), the effect of suppressing radiated fan noise can be simultaneously obtained by setting the sound-absorption frequency of the muffler in the duct to f, arranging the fan intake plane and the sound-absorbing plane (reflection plate) of the muffler in the duct substantially parallel, and setting the distance d(m) between these components to satisfy equation (3).

The muffler may be inside the cooling duct, the muffler may be formed by the reflection plate, the wall material, and the air chamber that is enclosed by the reflection plate and the wall material, a portion of the wall material may also serve as the wall of the cooling duct, and the sound-absorbing part may be a plurality of sound-absorbing parts.

On the other hand, the muffler formed inside the cooling duct may be formed by constructing a Helmholtz resonator by providing at least one through-hole on a reflection plate that may be set substantially parallel to and at the above-described distance d from the intake plane of the cooling fan to form an air chamber between the reflection plate and the wall material.

A through-hole may be provided in the reflection plate, the through-hole may be provided as a plurality of through-holes, the hole diameter of the through-holes may vary in the direction of thickness of the reflection plate, and a plurality of through-holes may be made up from two or more types of through-holes having different hole diameters.

In this case, a construction may be realized in which the sound-absorbing parts (e.g., the through-holes) of the Helmholtz resonator may be positioned in a reflection plate that may be parallel to the intake plane of the cooling fan, and the incidence of radiated sound (fan noise) may be substantially perpendicular to the openings of the sound-absorbing portions (through-holes), whereby the efficiency of the introduction of sound waves may be high and a large resonance sound absorption effect can be obtained.

In the case of this construction, moreover, the sound absorption action may take place at a position extremely close to the sound source (fan in take portion), whereby the sound reduction effect may be omnidirectional and the "overall value" of the operation noise can be effectively reduced.

On the other hand, when the reflection plate completely covers the intake plane, the intake operation of the fan may be obstructed and the necessary ventilation capability cannot be obtained, and as a result, the distance d between the fan intake plane and reflection plate may be 0<d. Typically, when this distance d becomes excessively small, problems occur such as an increase in aerodynamic noise caused by the wind drift of the blade intake stream, a decrease of air flow due to degradation of fan operation caused by an increase in the system impedance, and a loss of cooling capabilities.

In response to this problem, distance d may be preferably maintained to a distance of at least one-half the diameter of the opening provided in the air intake plane in the case of, for example, a sirocco fan.

Alternatively, a plate-shaped sound absorber may be constructed in place of a Helmholtz resonator as the muffler formed in the cooling duct.

A panel vibration part may be provided in the reflection plate, a plurality of panel vibration parts may be provided, and the plurality of panel vibration parts may be made up of two or more types of panel vibration parts having different panel natural frequencies.

As shown in FIG. 14, a panel sound absorber forms a vibration unit between back air layer 48*a* and fixed board 49, and when the frequency of sound (noise) that is incident from the outside matches the natural frequency of the vibration unit, fixed board 49 may resonate and attenuate the sound energy by means of internal friction to obtain a sound-absorbing action, the resonance frequency at this time being given by the following equation:

$$f_1 = \frac{1}{2\pi} \sqrt{\frac{1}{m_1}\left(\frac{1.4 \times 10^7}{L_3} + K_1\right)} \qquad (4)$$

where $f_1$ is the resonance frequency (Hz), $m_1$ is the surface density of the panel (kg/m$^2$), $L_3$ is the thickness of the back air layer (cm), and $K_1$ is the stiffness of the panel (kg/m$^2$·s$^2$).

Accordingly, a high noise suppression effect similar to that of the above-described Helmholtz resonator can be obtained if a panel sound absorber is constructed by providing at least one thin region in a reflection plate that may be set substantially parallel to and at the above-described distance d from the intake plane of the cooling fan to both form a panel vibration plane (fixed board 49 in the case of FIG. 14) and form an air layer between the wall material and the reflection plate.

Alternatively, as the muffler formed inside a cooling duct, a membrane sound absorber can be constructed as a muffler in place of the two mufflers described above.

A membrane vibration part may be formed in which the reflection plate has through-holes, and a sheet material may be applied to the reflection plate, and moreover, may cover the through-holes, a plurality of membrane vibration parts may be provided, and the plurality of membrane vibration parts may be made up of two or more types of membrane vibration parts having different membrane natural frequencies.

When a vibration system is produced from membrane material 50 such as vinyl sheet and back air layer 48$b$ as shown in FIG. 15, the membrane sound absorber may exhibit a peak-shaped sound-absorption characteristic that takes the resonance frequency as a center. This resonance frequency may be determined by the mass of the membrane, the tension when stretching the membrane, and the back air layer. In actuality, predicting the resonance frequency when tension is applied is considered problematic, but the resonance frequency when the membrane is spread while applying almost no tension may be given by the following equation:

$$f_2 = \frac{596}{\sqrt{m_2 \times L_4}} \quad (5)$$

where $f_2$ is the resonance frequency (Hz), $m_2$ is the surface density of the membrane (kg/m$^2$), and $L_4$ is the thickness of the back air layer (cm).

The difference between the above-described panel sound absorber and membrane sound absorber is that the stiffness of the membrane can be ignored.

In other words, equation (5) is derived by taking $K_1$ of equation (4) as "0".

In addition, the sound absorber may be a panel vibration part and through-holes provided in a reflection plate, the resonance frequency of the resonator sound absorber having through-holes may differ from the panel natural frequency of the panel vibration part, the sound absorber may be a membrane vibration part and through-holes provided in a reflection plate, the resonance frequency of the resonator sound absorber having through-holes may differ from the membrane natural frequency of the membrane vibration part, the sound absorber may be a panel vibration part and a membrane vibration part, the muffler may be a resonator sound absorber having a plurality of different resonance frequencies, and the panel natural frequency of the panel vibration part may differ from the membrane natural frequency of the membrane vibration part.

The reflection plate may be of a configuration that allows removal from the wall material, at least a portion of the wall material may be of a construction that allows removal, and the muffler may be of a configuration that allows removal from the cooling duct.

The electronic apparatus of the present invention may be characterized by being provided with any one of the above-described noise suppressors. The electronic apparatus may be a projection display device.

The method of adjusting the noise suppression characteristics of the present invention may be characterized by adjusting the resonance frequency of the resonator sound absorber by blocking at least one of the plurality of through-holes in a resonator sound absorber in which a plurality of through-holes may be provided in a reflection plate. The method may be further characterized by adjusting the resonance frequency of a resonator sound absorber by, in a noise suppressor that may be constructed to allow installation and removal of a reflection plate to and from the wall material, stacking another reflection plate having through-hole characteristics identical to the reflection plate on the reflection plate.

The noise suppressor of the present invention may obtain the effect of suppressing the radiation of fan noise by arranging a reflection plate at a position that may be substantially parallel to the fan intake plane inside a cooling duct and prescribing the distance between this fan intake plane and reflection plate within a region in which a near field may be formed in which the radiation power of fan noise is localized only in the vicinity of the sound source, and may raise the efficiency of introduction of fan noise to the muffler to enable an improvement in the sound absorption coefficient by forming a muffler constituted by a Helmholtz resonator, a panel sound absorber, or a membrane sound absorber from a reflection plate and an air chamber that may be formed on the opposite side of the reflection plate and providing this sound absorber part on the reflection plate. Accordingly, the present invention may have the effect of enabling a sound absorbing duct having a high noise suppression effect and that may be both compact and inexpensive.

The noise suppressor of the present invention has the further effect of enabling free alteration of the sound absorption frequency by allowing exchange of the reflection plate or a wall part of the muffler formed inside the cooling duct or by using seal pins or mask plates.

Further, by adopting a configuration in which the cavity volume of the air chamber may be of a multilayer construction and by providing sound-absorbing parts having sound absorption surfaces that may be based on different principles on the reflection plate, the noise suppressor of the present invention may have the effect of setting each of the sound absorption frequencies contiguous to each other to achieve a sound absorption effect over a broader bandwidth, and further, of simultaneously enabling an improvement in noise suppression performance and greater freedom of performance design.

BRIEF DESCRIPTION OF THE DRAWINGS

The above and other objects, features, and advantages of the present invention will become apparent from the following description with reference to the accompanying drawings, which illustrate examples of the present invention.

FIG. 16(c) shows the back view as seen from the side of the cooling fan of the noise suppressor (cooing duct) of the present invention;

FIG. 17 is an exploded perspective view for explaining the configuration of the cooling duct portion in the first embodiment of the noise suppressor of the present invention;

FIG. 25 is a schematic explanatory view showing the configuration of a portion of the cooling duct for explaining the second method for adjusting the sound-absorbing frequency of the noise suppressor of the present invention, FIG. 25(a) showing a perspective view of a portion of the cooling duct, FIG. 25(b) showing a sectional view of FIG. 25(a), FIG. 25(c) showing a perspective view for explaining the exchange of the duct shell, FIG. 25(d) showing a perspective view of a portion of the cooling duct after exchange of the duct shell, and FIG. 25(e) showing a sectional view of FIG. 25(d);

FIGS. 35(a)-35(c) are schematic explanatory views showing the configuration of the cooling duct portion for explaining the sixth method of broadening the bandwidth of the sound-absorption frequency of the noise suppressor of the present invention, FIG. 35(a) showing a perspective view, FIG. 35(b) showing a top view, and FIG. 35(c) showing a sectional view;

DETAILED DESCRIPTION OF THE EXEMPLARY EMBODIMENTS

Referring again to the drawings and in particular FIGS. 16(a)-37(d), the exemplary embodiments of the noise suppressor of the present invention will now be described.

Figure 1:
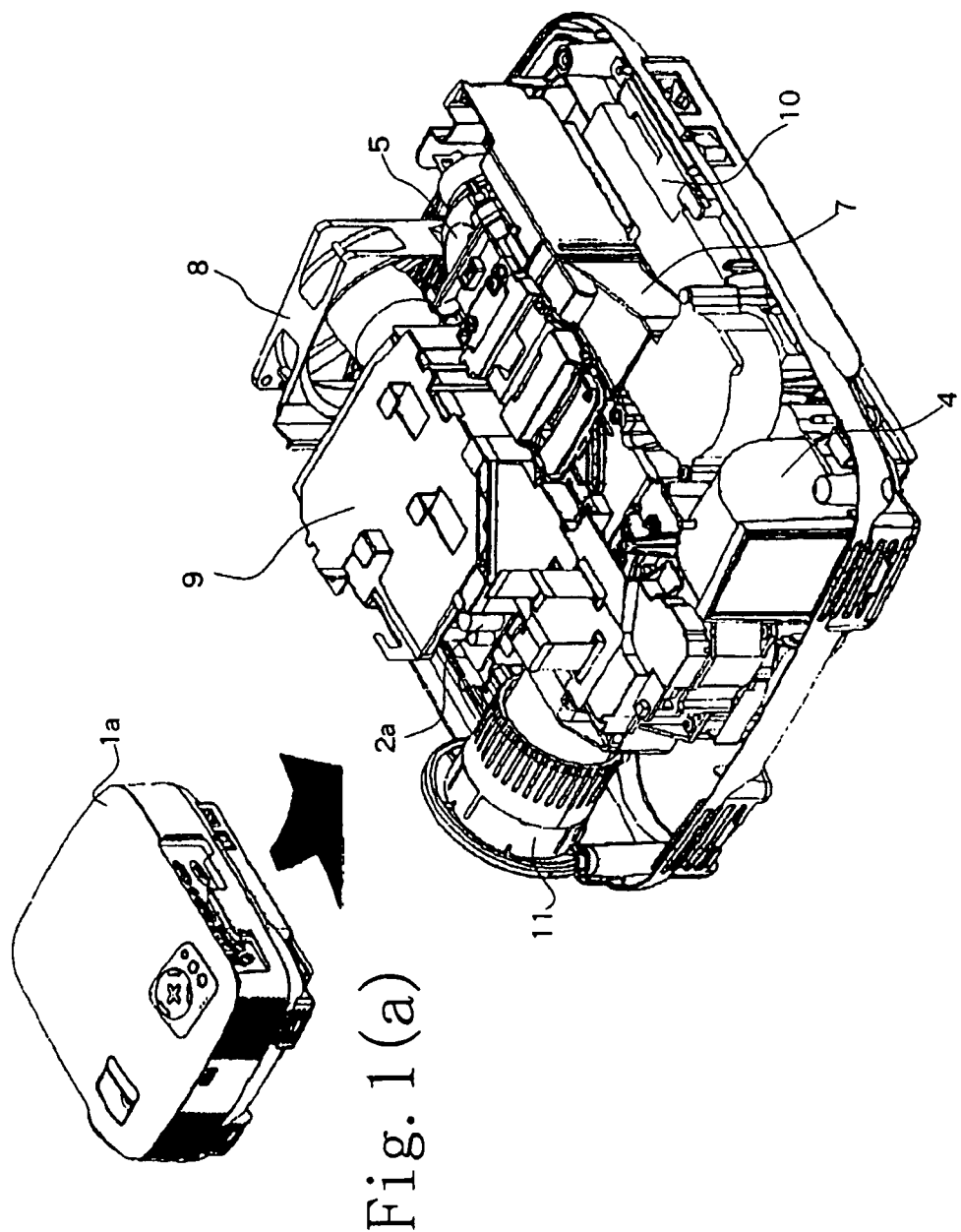
FIGS. 1(*a*) and 1(*b*) are schematic perspective views of a liquid crystal projector of the prior art, FIG. 1(*a*) showing the assembled state, and FIG. 1(*b*) showing the interior with the cover removed.
Figure 2:
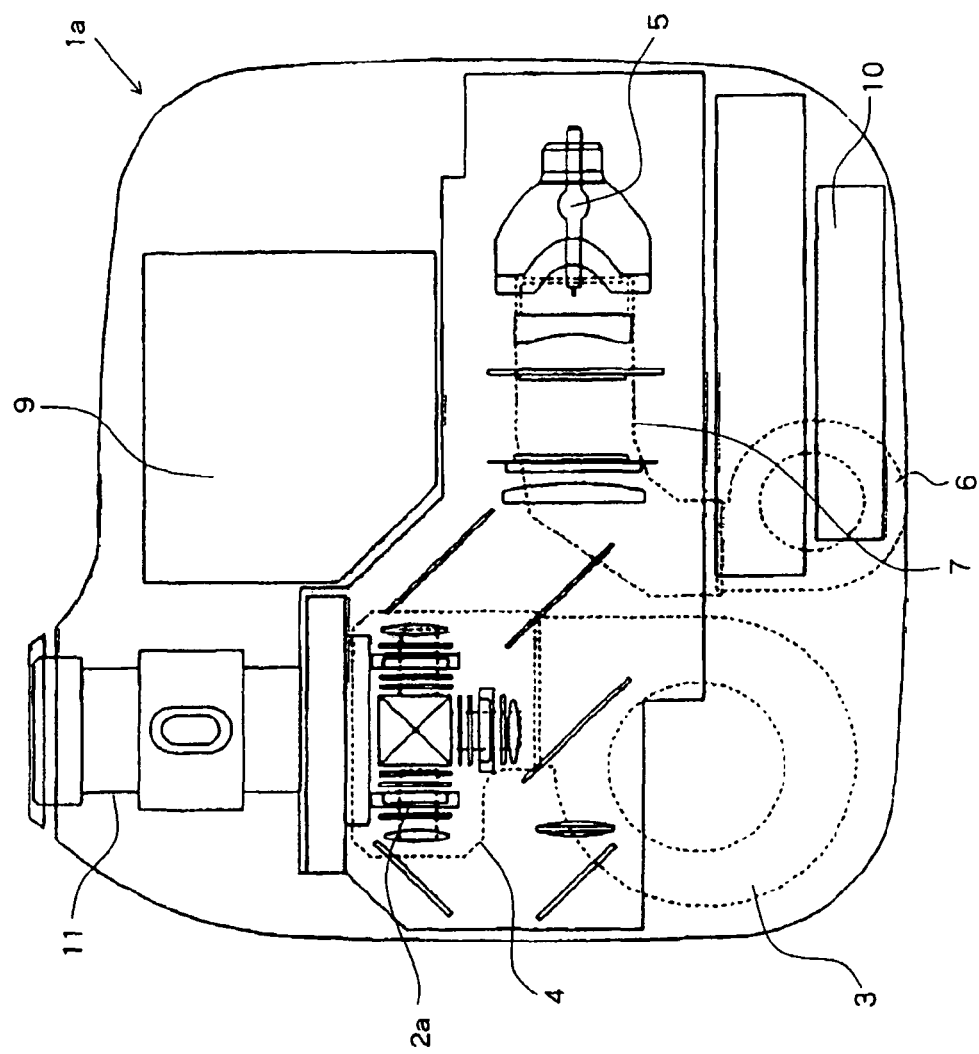
FIG. 2 is a schematic block diagram of the interior of a liquid crystal projector of the prior art.
Figure 3A:
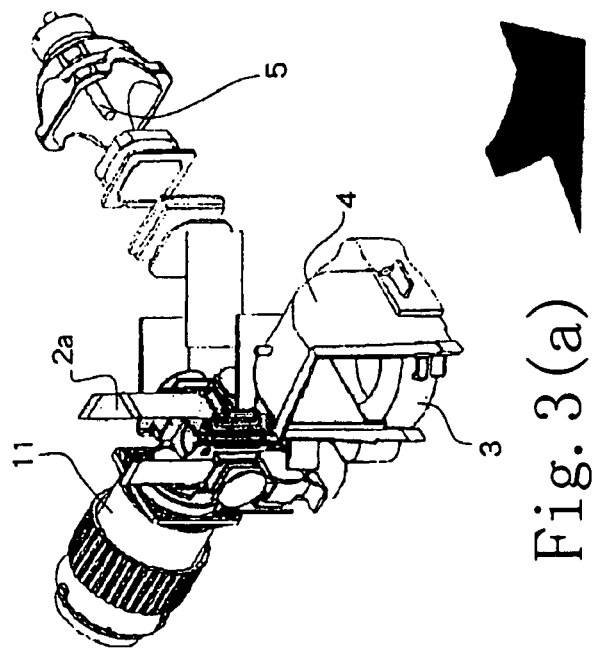
FIGS. 3(*a*) and 3(*b*) are schematic perspective views showing the configuration of the liquid crystal panel cooling module of a liquid crystal projector of the prior art, FIG. 3(*a*) showing the overall configuration, and FIG. 3(*b*) showing an exploded perspective view of the cooling system of the optical modulation module.
Figure 3B:
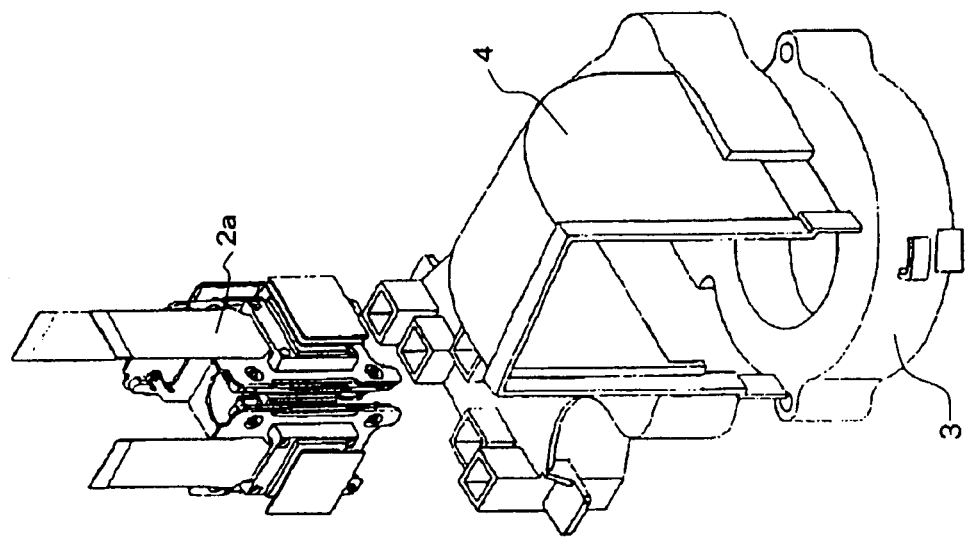
Figure 4:
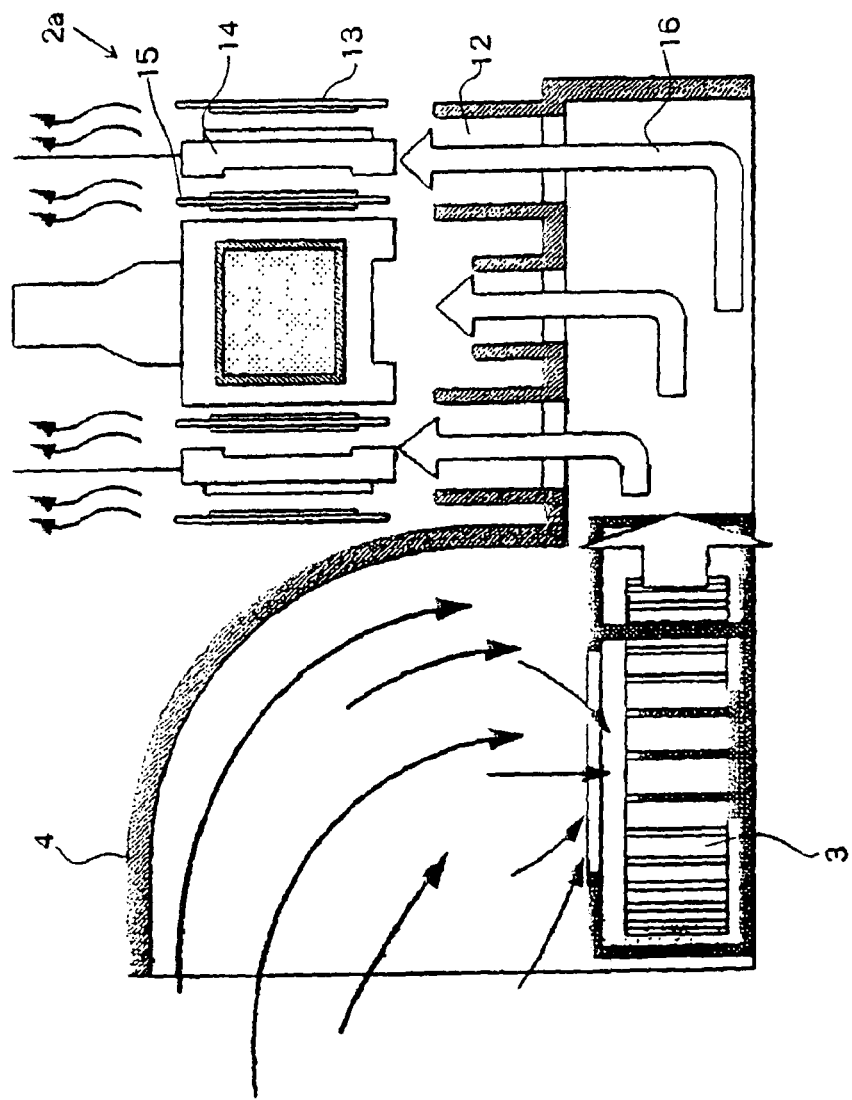
FIG. 4 is a schematic sectional view for explaining the operation of forced-air cooling of the liquid crystal panel cooling module of a liquid crystal projector of the prior art.
Figure 5A:
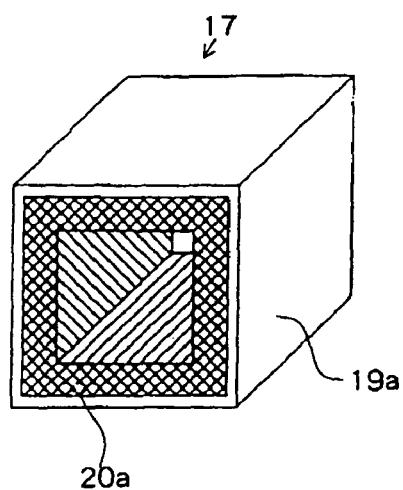
FIGS. 5(*a*) and 5(*b*) are schematic views showing the configuration of a typical lined duct dissipative muffler of the prior art, FIG. 5(*a*) showing a perspective view, and FIG. 5(*b*) showing a sectional view.
Figure 5B:
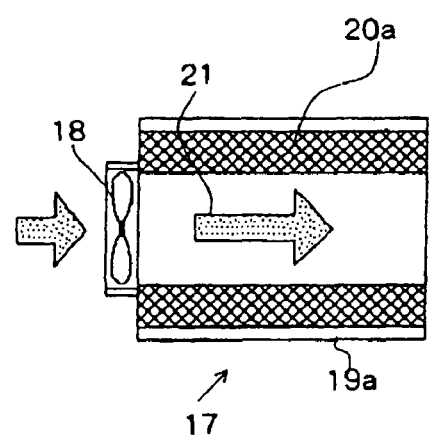
Figure 6:
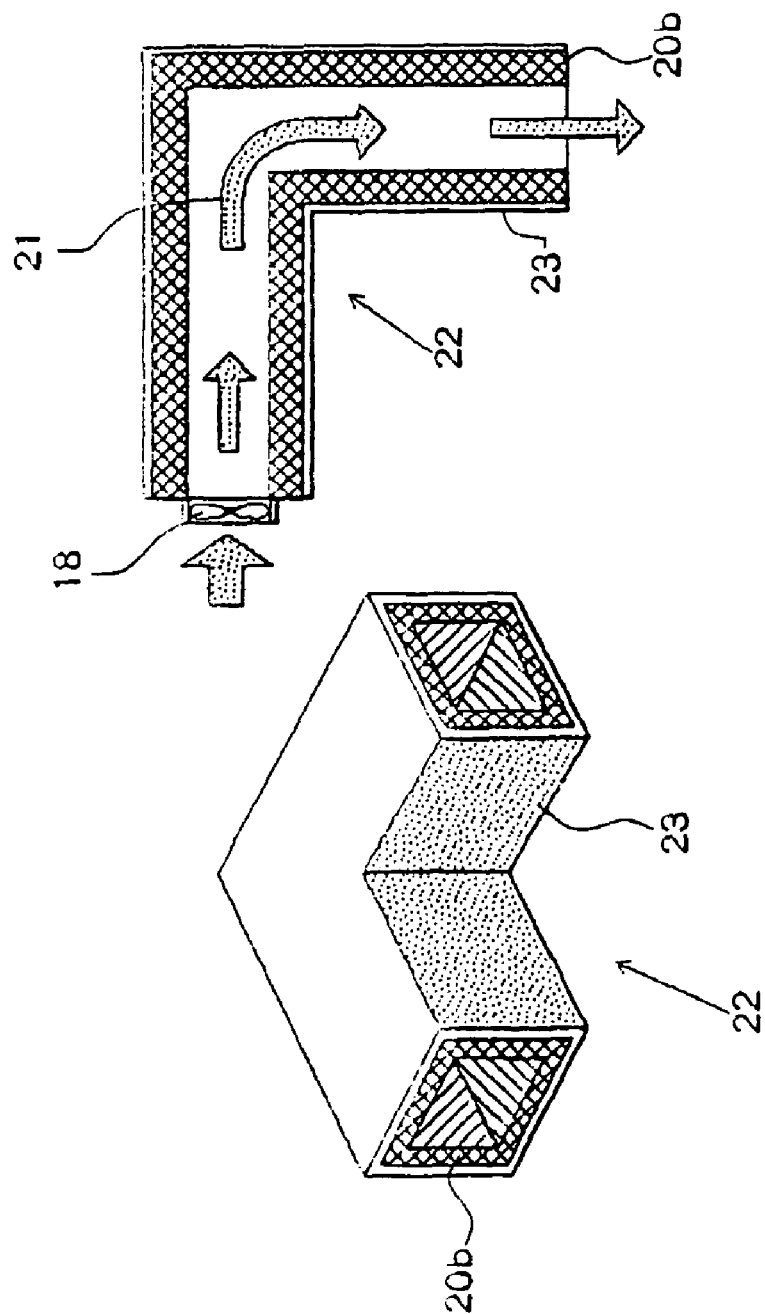
FIGS. 6(a) and 6(b) are schematic views showing the configuration of a typical lined elbow-type duct dissipative muffler of the prior art, FIG. 6(a) showing a perspective view, and FIG. 6(b) showing a sectional view.
Figure 7:
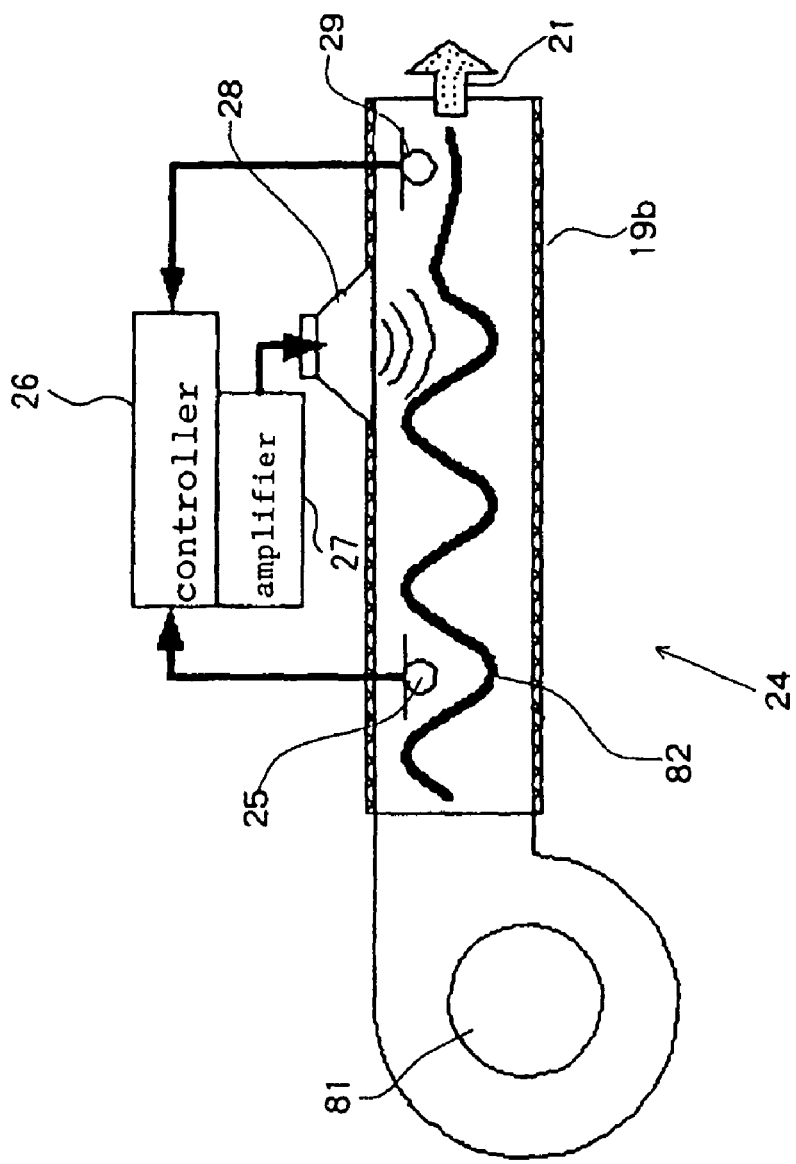
FIG. 7 is a schematic partial sectional side view for explaining the configuration and action of the active noise control muffler of the prior art.
Figure 8:
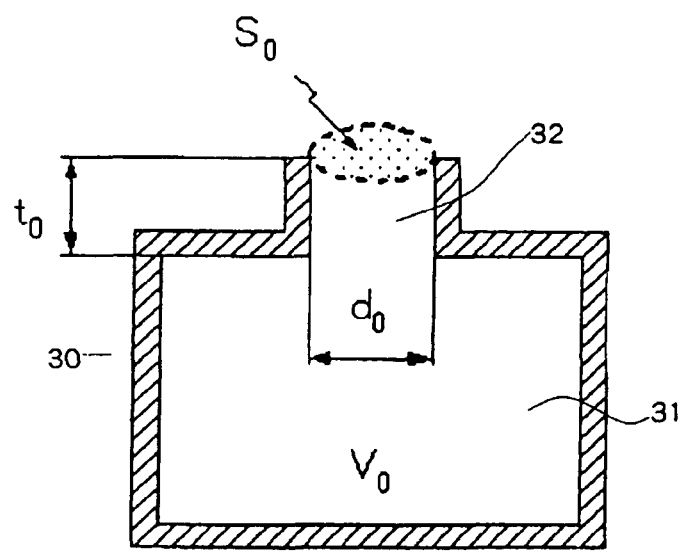
FIG. 8 is a schematic sectional view showing the basic configuration of a Helmholtz resonator.
Figure 9:
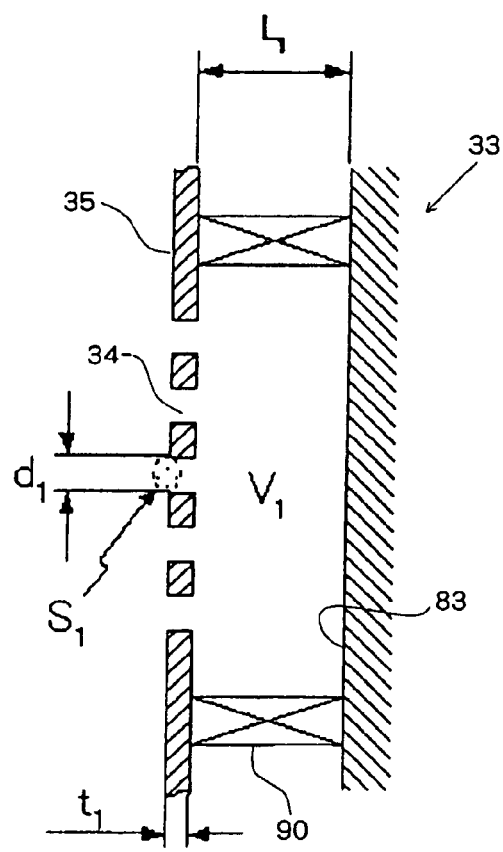
FIG. 9 is a schematic view showing the basic configuration of a perforated panel sound absorber that uses the principles of a Helmholtz resonator.
Figure 10:
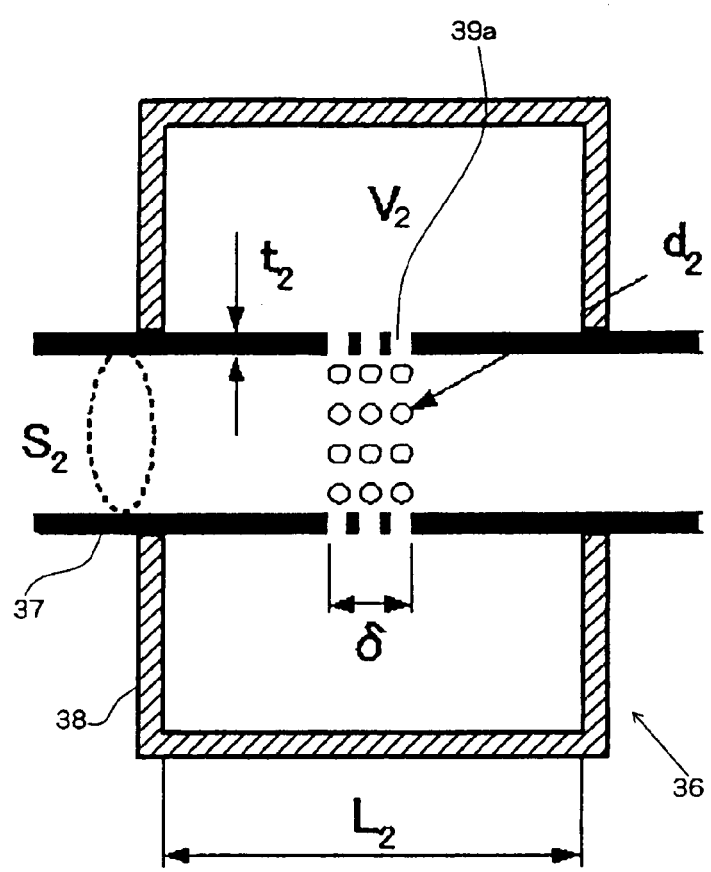
FIG. 10 is a schematic view showing the configuration of a porous-pipe resonator muffler of the prior art.
Figure 11:
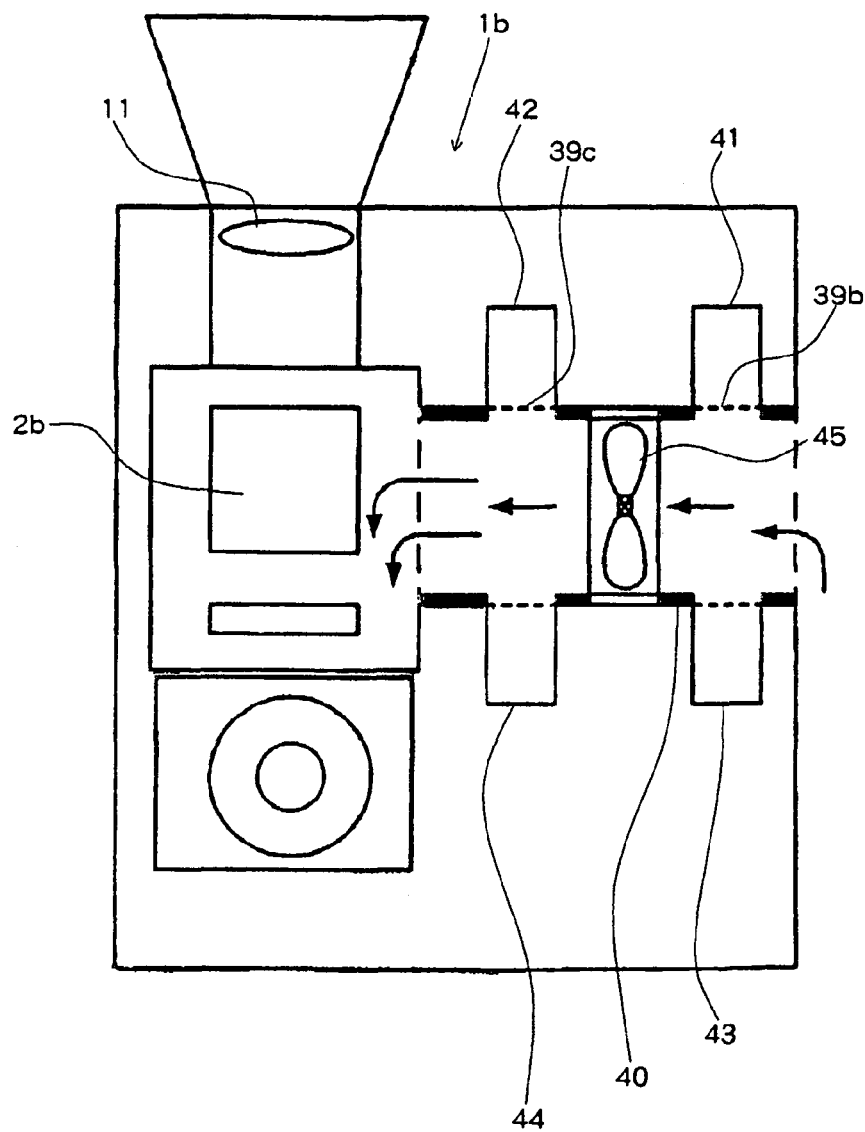
FIG. 11 is a schematic sectional view showing the schematic configuration of the liquid crystal projector of the noise suppressor disclosed in JP-A-2001-222065.
Figure 12A:
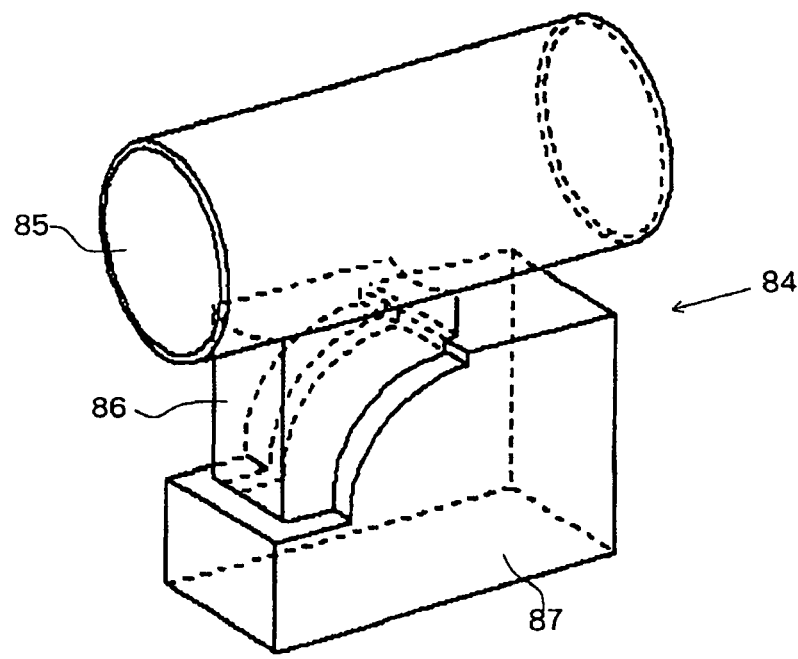
FIGS. 12(a) and 12(b) are schematic views of the noise suppressor disclosed in JP-A-2005-30308, FIG. 12(a) showing a partial perspective view and FIG. 12(b) showing a side sectional view.
Figure 12B:
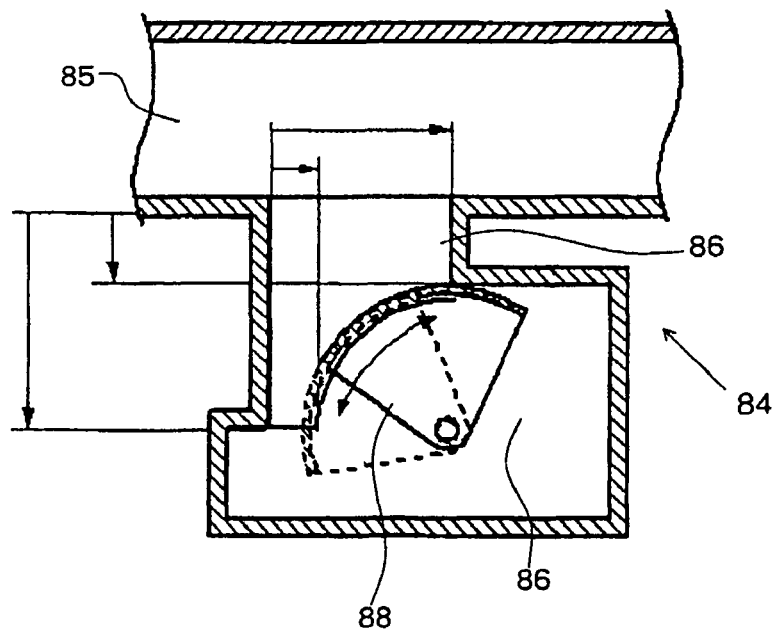
Figure 13:
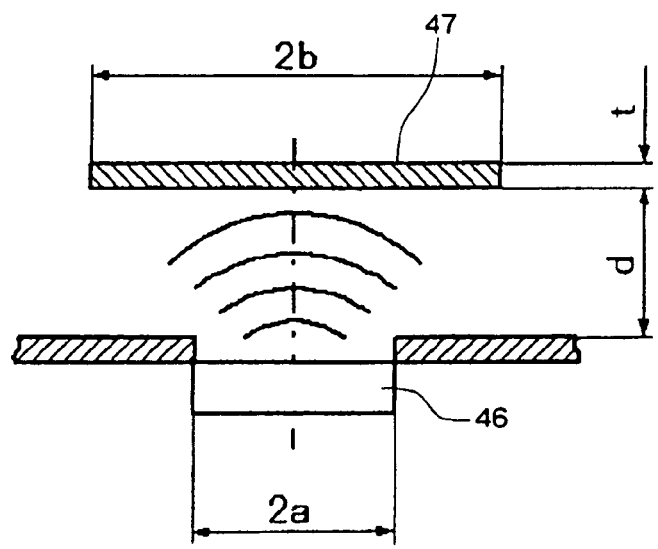
FIG. 13 is a schematic view for explaining the principles relating to passive control of sound radiated by a reflection plate.
Figure 14:
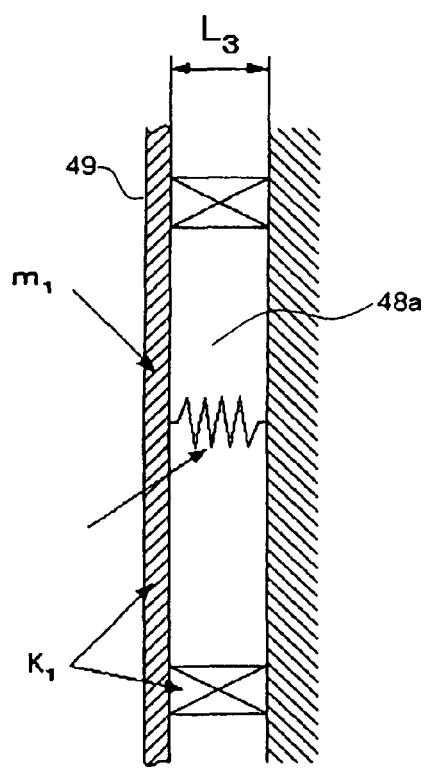
FIG. 14 is a schematic view showing the basic configuration of a typical panel sound absorber.
Figure 15:
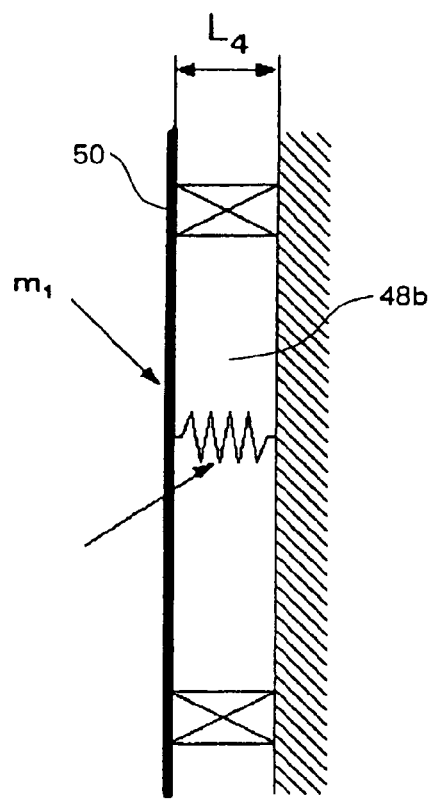
FIG. 15 is a schematic view showing the basic configuration of a typical membrane sound absorber.
Figure 16A:
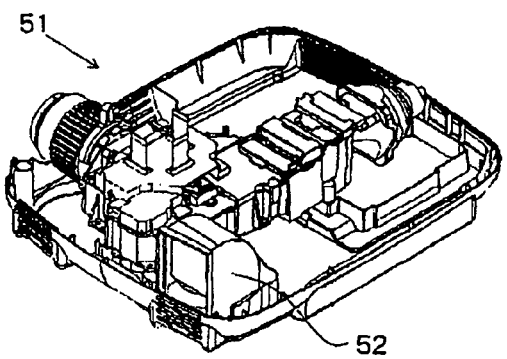
FIGS. 16(a), 16(b) and 16(c) are explanatory views of a noise suppressor of the first embodiment of the present invention, FIG. 16(a) showing a schematic perspective view of the sate in which the cover has been removed from an electronic apparatus (liquid crystal projector) in which the noise suppressor of the present invention has been installed, FIG. 16(b) showing an exploded perspective view of the state in which only a portion of the noise suppressor (cooling duct) has been removed from an electronic apparatus (liquid crystal projector) in which the noise suppressor of the present invention has been installed.
Figure 16B:
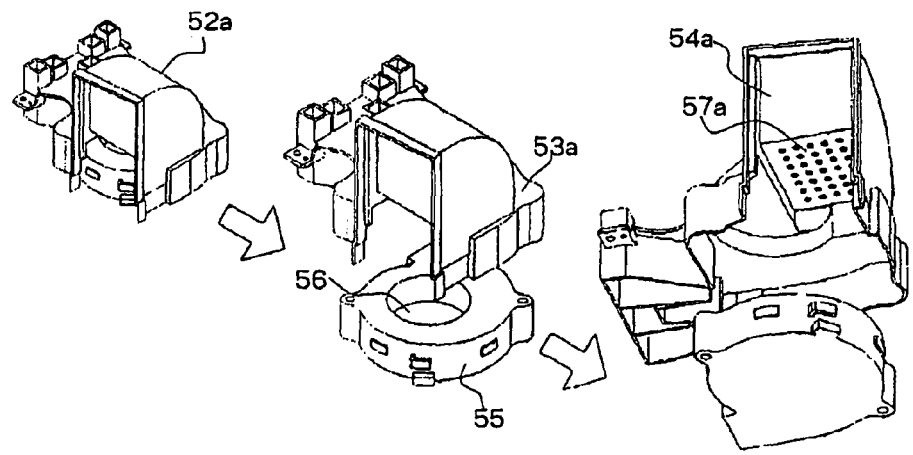
Figure 16C:
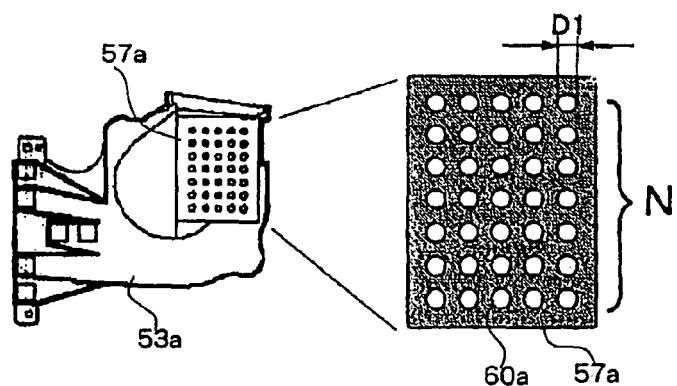

FIGS. 16(a)-16(c) are explanatory views of the noise suppressor of the first embodiment of the present invention, FIG. 16(a) showing a schematic perspective view of an electronic apparatus (liquid crystal projector) in which the noise suppressor of the present invention may be installed, the cover of the electronic apparatus being removed, FIG. 16(b) is an exploded perspective view in which only the noise suppressor portion (cooling duct) has been removed from the electronic apparatus (liquid crystal projector) in which the noise suppressor of the present invention has been installed, and FIG. 16(c) is a rear view of the noise suppressor (cooling duct) of the present invention as seen from the side of the cooling fan.

FIG. 17 is an exploded perspective view for explaining the configuration of the cooling duct portion in the first embodiment of the noise suppressor of the present invention.

Figure 18:
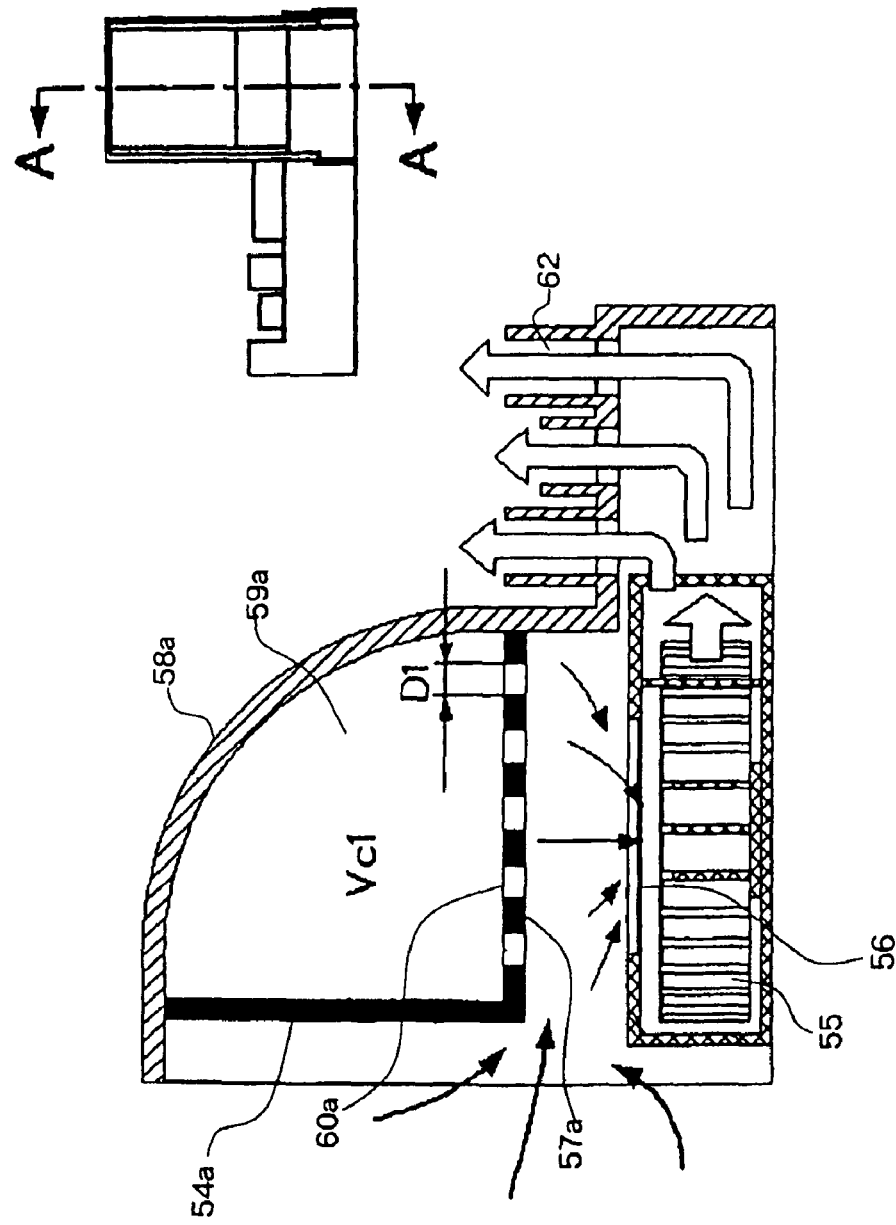
FIG. 18 is a schematic sectional view for explaining the internal configuration and ventilating operation of the cooling duct in the first embodiment of the noise suppressor of the present invention.

FIG. 18 is a schematic sectional view for explaining the internal configuration and the ventilating operation of the cooling duct in the first embodiment of the noise suppressor of the present invention.

Figure 19:
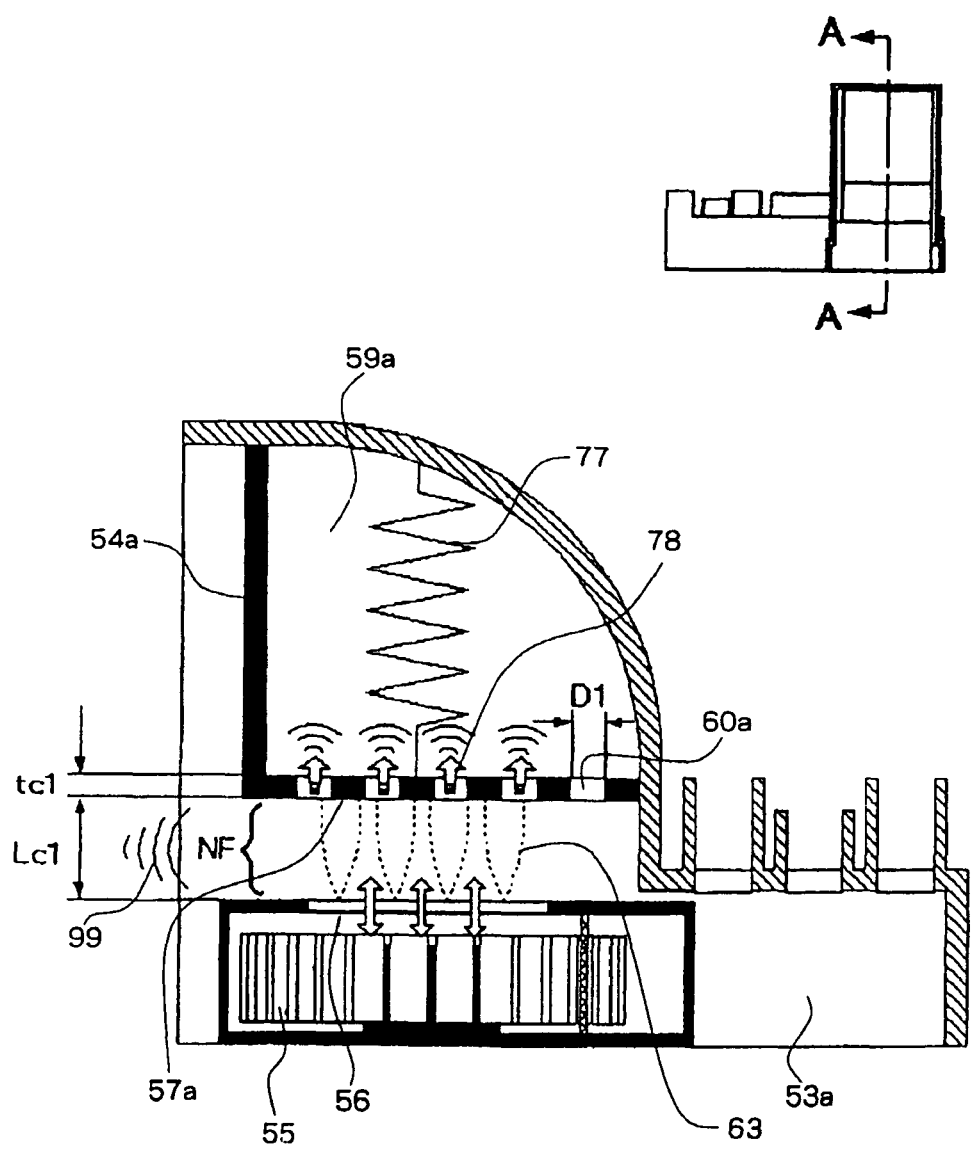
FIG. 19 is a sectional view for explaining the sound-absorbing operation in the interior of the cooling duct in the first embodiment of the noise suppressor of the present invention.

FIG. 19 is a schematic sectional view for explaining the sound-absorbing operation in the cooling duct in the first embodiment of the noise suppressor of the present invention.

The noise suppressor of the present invention may be included, for example, in an electronic apparatus such as a liquid crystal projector, but the present invention is not limited to this form. The present invention can be widely applied, for example, to apparatuses or devices provided with a cooling mechanism having an air blower.

Noise suppressor 52a of electronic apparatus 51 may be made up from cooling duct 53a of a liquid crystal panel, and muffler 54a provided inside this cooling duct. Here, muffler 54a includes reflection plate 57a in a position substantially parallel to and confronting intake plane 56 of cooling fan 55, this reflection plate 57a together with wall part 58a forming air chamber 59a on the back surface of reflection plate 57a as seen from cooling fan 55, and a Helmholtz resonator may be formed that uses reflection plate 57a as a sound-absorbing part by providing (e.g., simultaneously providing) a plurality of through-holes 60a that link with air chamber 59 behind reflection plate 57a.

In this case, the number N of through-holes and the diameter D1 of through-holes provided in muffler 54a as well as the volume $V_{c1}$ of back air chamber 59a (or the thickness of the back air layer) may be determined by means of equation (1) of the Helmholtz resonance frequency in accordance with the cooling fan noise frequency ($f_r$) that is to be absorbed.

As shown in FIG. 17, the present embodiment may be of a configuration in which joining L-shaped plate 61a to cooling duct 53a may allow (e.g., may simultaneously allow) the disposition of reflection plate 57a provided with through-holes 60a, which may be the sound-absorbing part, substantially parallel to intake plane 56 of the cooling fan and the formation of air chamber 59a that is behind.

A sirocco fan may be chiefly used as cooling fan 55, and as shown in FIG. 18, this cooling fan 55 may pull outside air in from the reflection plate 57a side of muffler 54a, direct the air toward the interior of cooling duct 53a for the passage of air, and expel the air from each duct opening 62 to implement forced-air cooling of each of the R/G/B liquid crystal units (not shown).

The following explanation regards the sound-absorbing operation of the noise suppressor of the present embodiment using FIG. 19. In the cooling duct, reflection plate 57a that may be arranged substantially parallel to fan intake plane 56 of cooling fan 55 may form a near field (NF) in which the radiated power of the fan operation noise in a bandwidth of noise frequency ($f_r$) for which the distance $L_{c1}$ (=d) from the intake plane satisfies equation (3) becomes only mode 63 in a perpendicular direction localized in the vicinity of the sound source (the cooling fan intake plane) without being transmitted outside the cooling duct along reflection plate 57a as a traveling wave.

In this case, the radiated sound from the near field toward the free field may be attenuated exponentially and therefore suppressed. At the same time, the standing waves of mode 63 in the perpendicular direction (with the intake plane) that are localized between cooling fan intake plane 56 and reflection plate 57a of muffler 54a may be efficiently directed toward resonance sound absorbers 78 (through-holes 60a) of the Helmholtz resonator that may be provided on reflection plate 57a, whereby the sound energy of that resonance frequency ($f_r$) may be subjected to viscous damping to realize the sound-absorbing effect.

In noise suppressor 52a of this configuration, not only can sound radiated toward the outside of the duct be effectively reduced, but the introduction of sound waves to muffler 54a can also be realized in a form close to perpendicular incidence. The efficiency of introduction can therefore be set higher, and a greater sound-absorbing effect can be obtained even from a compact muffler having a small cavity volume.

In addition, the sound-absorbing operation can be implemented at a position extremely close to the sound source (e.g., cooling fan intake plane), whereby a nondirectional noise suppression effect can be obtained having a sound-absorbing effect that may be apparent in every direction, and the "overall value" of the operating noise of an electronic apparatus can therefore be effectively reduced.

Figure 20A:
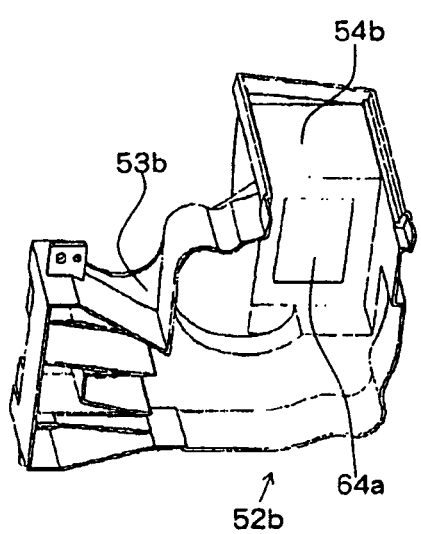
FIGS. 20(a) and 20(b) are explanatory views of the noise suppressor of the second embodiment of the present invention, FIG. 20(a) showing a schematic perspective view explaining the configuration of the cooling duct, and FIG. 20(b) showing a schematic sectional view explaining the configuration of the sound absorber in the cooling duct.
Figure 20B:
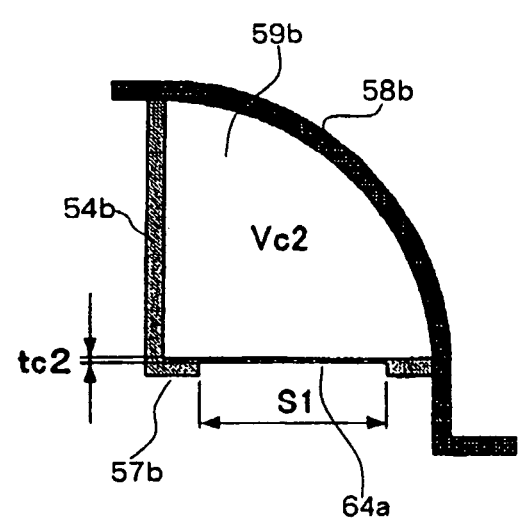

The following explanation regards the second embodiment of the noise suppressor of the present invention while referring to the accompanying figures. FIGS. 20(a) and 20(b) are explanatory views of the noise suppressor of the second embodiment of the present invention, FIG. 20(a) being a schematic perspective view for explaining the configuration of the cooling duct, and FIG. 20(b) being a schematic sectional view for explaining the configuration of the muffler in the cooling duct. In addition, FIG. 21 is a schematic sectional view for explaining the sound-absorbing operation inside the cooling duct in the second embodiment of the noise suppressor of the present invention.

Noise suppressor 52b in the present embodiment is of a configuration in which muffler 54a provided in cooling duct 53a in the first embodiment may be made up from a panel sound absorber in place of a Helmholtz resonator. In other words, noise suppressor 52b includes reflection plate 57b at a position confronting and substantially parallel to fan intake plane 56 of cooling fan 55, this reflection plate 57b together with wall part 58b forming air chamber 59b behind reflection plate 57b as seen from cooling fan 55. At the same time, the provision of thin region (panel vibration part) 64a in reflection plate 57b forms a panel sound absorber that takes thin region 64a of reflection plate 57b as its vibration surface (sound absorber).

In this case, the thickness tc2 and the area S1 of thin region (panel vibration part) 64a provided in reflection plate 57b may determine the stiffness of the panel. The stiffness of the panel, the volume ($V_{c2}$: or the thickness of the back air space) of air chamber 59b, and the surface density of reflection plate 57b together may determine the sound-absorbing frequency of panel vibration, which may be determined by equation (2). That is, the panel thickness, the area of thin region (panel vibration part) 64a, and the thickness of back air chamber 59b may be determined to match the frequency of the fan noise that is to be reduced.

Figure 21:
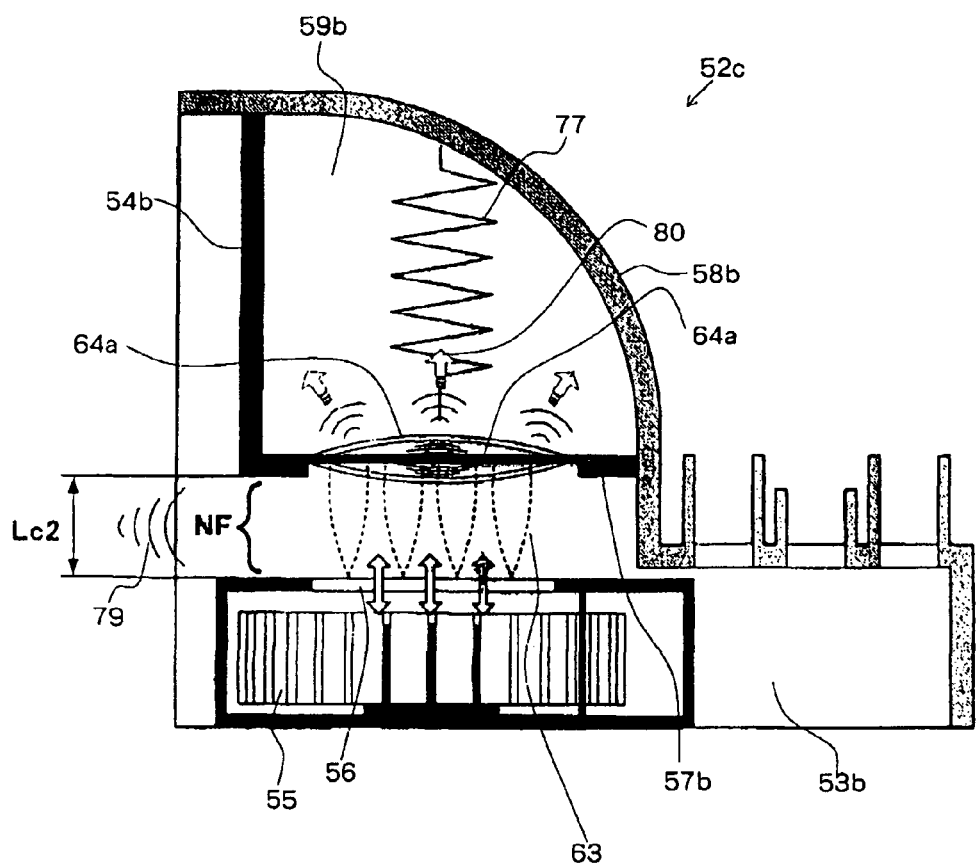
FIG. 21 is a schematic sectional view for explaining the sound-absorbing operation in the cooling duct in the second embodiment of the noise suppressor of the present invention.
Figure 22:
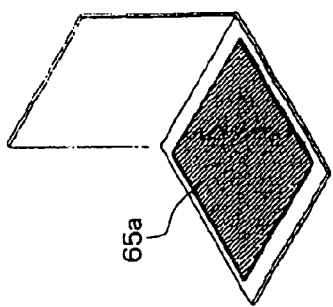
FIGS. 22(a)-22(d) are explanatory views of the noise suppressor of the third embodiment of the present invention, FIG. 22(a) showing a schematic perspective view for explaining the configuration of the cooling duct, and FIG. 22(b) and FIG. 22(c) showing schematic perspective views for explaining the configuration of the L-shaped added wall material that forms the sound absorber in the cooling duct, and FIG. 22(d) showing a schematic sectional view for explaining the configuration of the sound absorber in the cooling duct.
Figure 22:
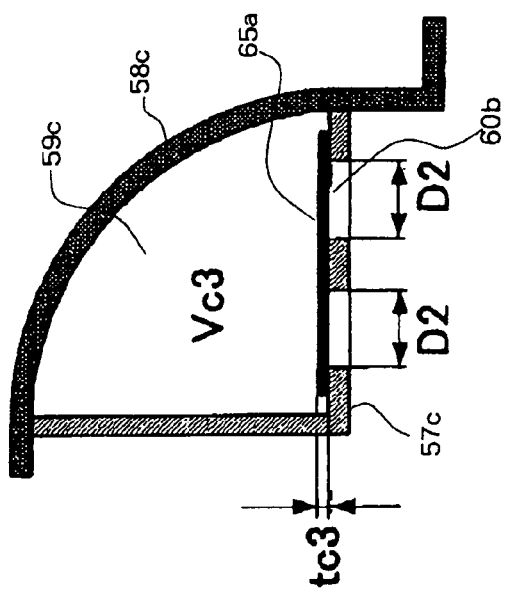
Figure 22:
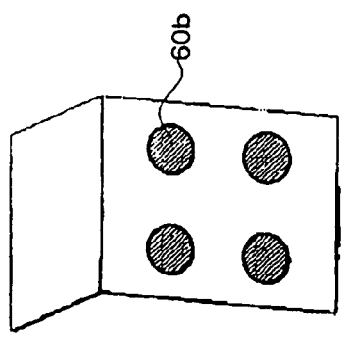
Figure 22:
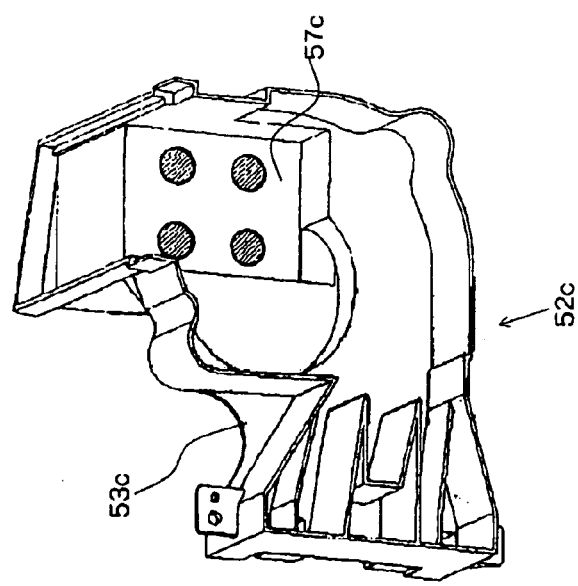

The following explanation regards the sound-absorbing operation of the noise suppressor of the second embodiment using FIG. 21. In the noise suppressor of the second embodiment, as in the first embodiment, a near field (NF) may be formed between fan intake plane 56 of cooling fan 55 and reflection plate 57b that may be arranged substantially parallel and separated by distance $L_{c2}$, whereby the progression of radiated noise to the free field may be suppressed. At the same time, when thin region (panel vibration part) 64a receives waves of a mode localized in a perpendicular direction to fan intake plane 56 at thin region 64a (panel vibration part) provided in reflection plate 57b, panel vibration resonance may occur at the characteristic value of this system and the sound energy may be damped by air viscosity. In this case as well, a sound-absorbing effect of sufficient degree can be obtained by a compact noise suppression configuration for the same reasons as in the first embodiment.

The following explanation regards the third embodiment of the noise suppressor of the present invention while referring to the accompanying figures.

Figure 23:
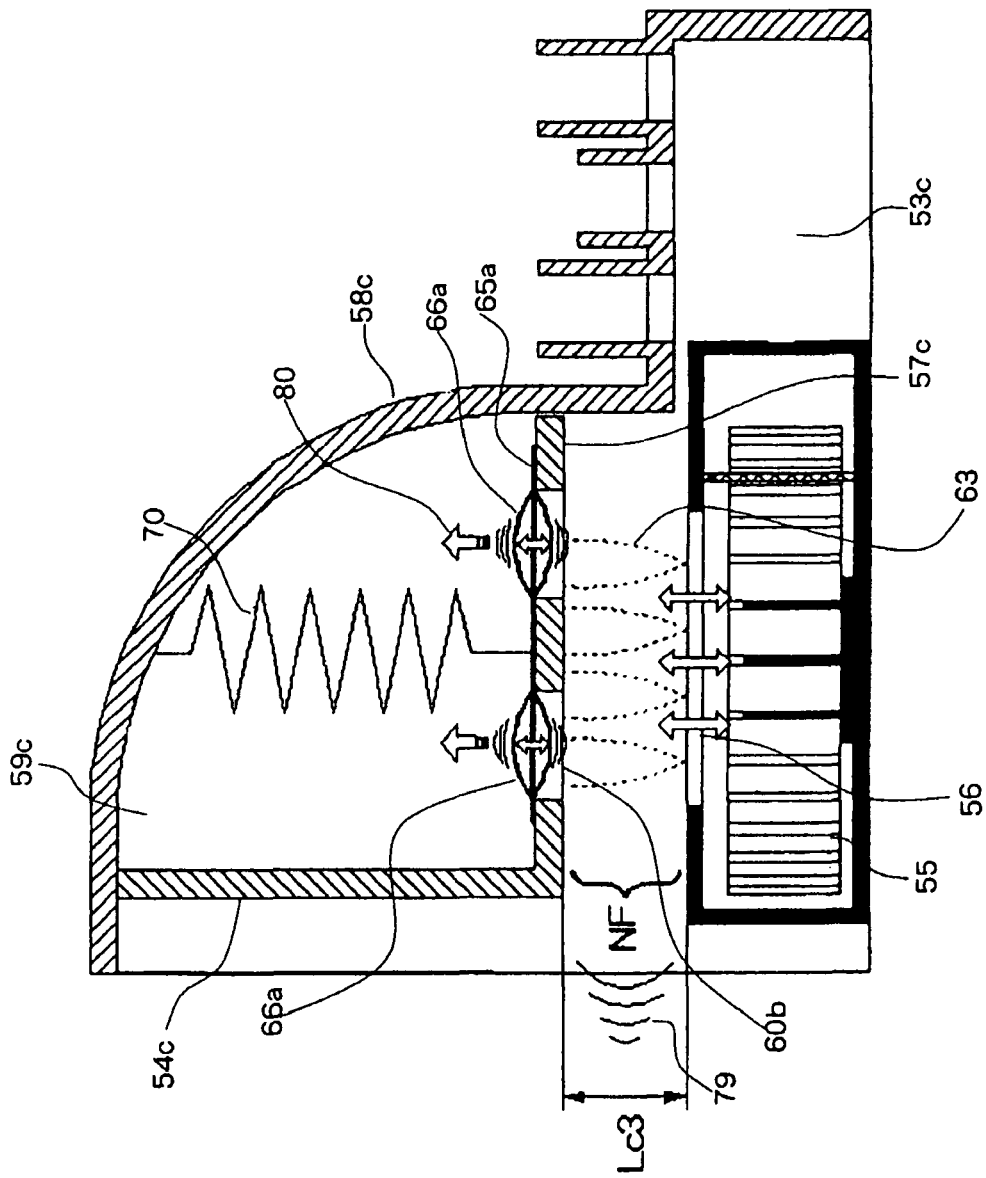
FIG. 23 is a schematic sectional view for explaining the sound-absorbing operation in the cooling duct in the third embodiment of the noise suppressor of the present invention.

FIGS. 22(a)-22(d) are explanatory views of the noise suppressor of the third embodiment of the present invention, FIG. 22(a) being a schematic perspective view for explaining the configuration of the cooling duct, FIG. 22(b) and FIG. 22(c) being schematic perspective views for explaining the configuration of the added wall part of L shape that forms the sound absorber in the cooling duct, and FIG. 22(d) being a schematic sectional view for explaining the configuration of the sound absorber in the cooling duct. In addition, FIG. 23 is a schematic sectional view for explaining the sound-absorbing operation in the cooling duct in the third embodiment of the noise suppressor of the present invention.

Noise suppressor 52c in the present embodiment may be of a configuration in which muffler 54a provided in the cooling duct in the first embodiment may be a membrane sound absorber instead of a Helmholtz resonator.

In other words, reflection plate 57c may be provided at a position substantially parallel to and confronting fan intake plane 56 of cooling fan 55, and reflection plate 57c together with wall part 58c forms air chamber 59c that may be behind reflection plate 57c as seen from cooling fan 55. At the same time, through-holes 60b are provided in reflection plate 57c, and further, sheet material 65a may be applied to cover through-holes 60b, whereby membrane sound absorbers are formed having membrane vibration parts 66a (sound-absorbing parts) in reflection plate 57c.

In this case, the surface density of sheet material 65a provided on reflection plate 57c and the volume ($V_{c3}$) of rearward air chamber determine the sound-absorption frequency of the membrane vibration, and the membrane vibration area that may be composed of through-hole diameter $D_2$ and the number of through-holes together with the thickness of the rearward air layer may determine the magnitude of the sound absorption coefficient. Although membrane thickness $t_{c3}$ together with the tension may determine the membrane stiffness and may be a parameter that affects the resonance frequency (membrane natural frequency), due to the difficulty of prediction, it is more realistic to find this value by actual measurement as the amount of divergence from equation (5).

The following explanation regards the sound-absorbing operation of the noise suppressor of the third embodiment using FIG. 23. In the present embodiment, as in the first embodiment, a near field (NF) may be formed between fan intake plane 56 of cooling fan 55 and reflection plate 57c that may be arranged substantially parallel to and separated by distance $L_{c3}$, whereby the progression of radiated sound to the free field may be suppressed. At the same time, when waves of a mode localized in a direction perpendicular to fan intake plane 56 are received at membrane vibration part 66a provided on the reflection plate, membrane vibration resonance may occur at the natural frequency of this system, whereby the sound energy may be damped by viscous damping 80 that may be caused by air viscosity. In this case as well, a sound absorption effect of sufficient magnitude can be obtained by mean of a compact noise suppression configuration for the same reasons as in the first embodiment.

The following explanation regards the details of the method for effectively controlling the sound absorption characteristics in the noise suppressor of the present invention while referring to the accompanying figures.

This explanation first regards methods of adjusting the sound-absorption frequency of the muffler provided in the cooling duct. These methods are provided as a means for facilitating adjustment when the sound-absorption frequency of a noise suppressor that has been provided diverges from the target noise of a cooling device that is being applied (the frequency of the noise that is to be attenuated) as a result of, for example, changes of the specifications of the cooling fan.

Figure 24:
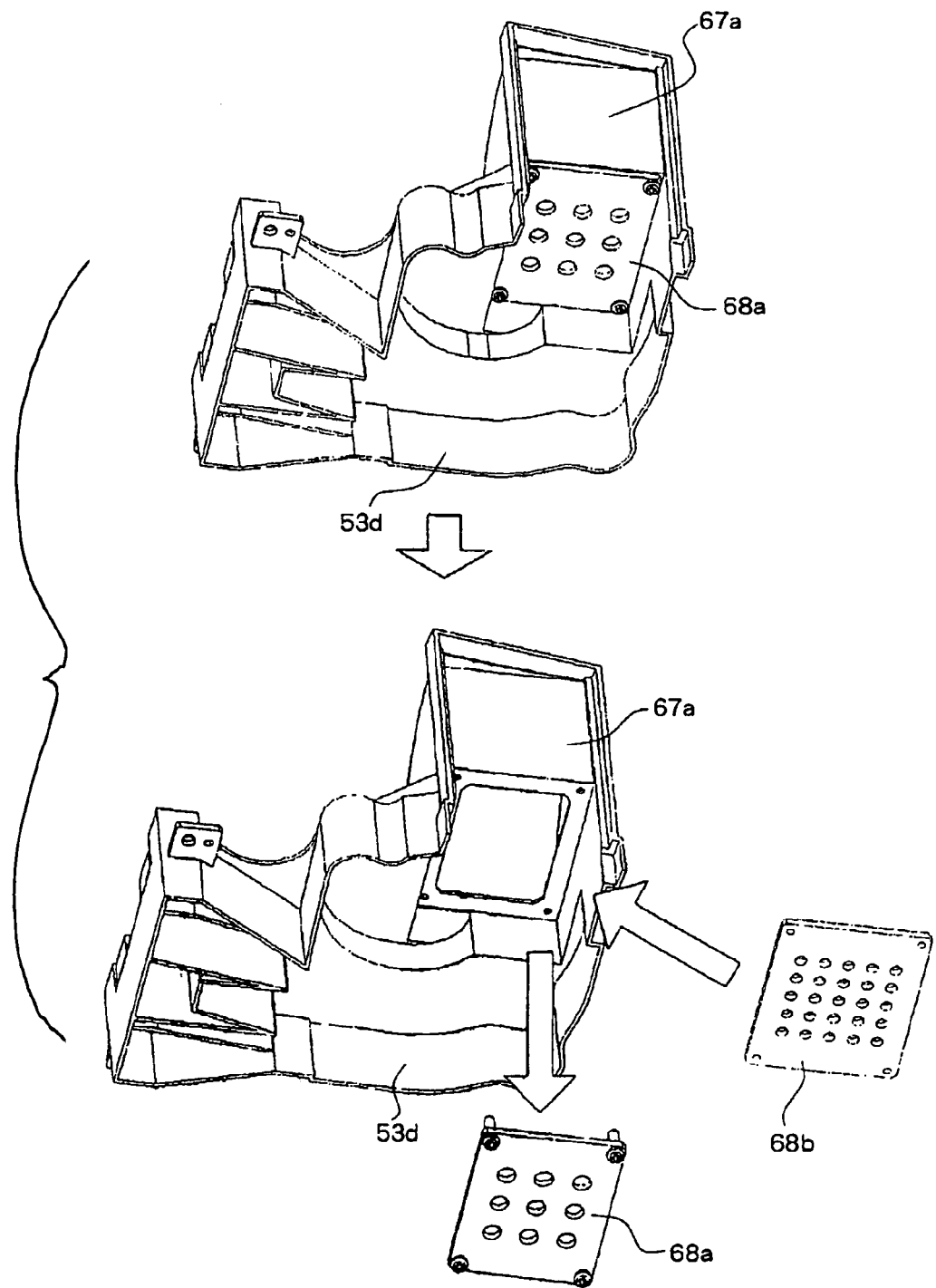
FIG. 24 is an exploded perspective view showing the configuration of a portion of the cooling duct for explaining the first method for adjusting the sound-absorbing frequency of the noise suppressor of the present invention.

FIG. 24 is an exploded perspective view showing the configuration of the cooling duct portion for explaining the first method of adjusting the sound-absorption frequency of the noise suppressor of the present invention. In the first sound-absorption frequency adjustment method, in the noise suppressor of the present invention, the sound-absorbing parts provided on the reflection plate that may be arranged substantially parallel to the intake plane of the cooling fan may be set to allow exchange.

For example, in FIG. 24, first sound-absorbing plate 68a (reflection plate) provided with a plurality of through-holes of Helmholtz resonator 67a that may be used in the first embodiment may be exchanged for second sound-absorbing plate 68b having a different number of through-holes or through-holes having different diameter or a different neck portion length. That is, reflection plates are exchanged that have different through-hole characteristics such as the diameter or number of through-holes or the plate thickness of the reflection plate, whereby the resonance frequency of the Helmholtz resonator formed by the through-holes of reflection plate together with the air chamber behind the reflection plate can be freely altered based on equation (1).

Although explanation of this adjustment method regards a case in which a Helmholtz resonator may be employed for the muffler provided in the cooling duct, it will be clear that the same adjustment may be possible when a panel sound absorber or membrane sound absorber is employed. That is, when a panel sound absorber is employed, sound-absorbing plates in which the panel thickness or area of the thin region provided on the reflection plate is altered and that therefore have different panel natural frequencies may be exchanged. When a membrane sound absorber is employed, sound-absorbing plates in which the diameter of through-holes and sheet material are altered and that therefore have different membrane natural frequencies may be exchanged.

FIGS. 25(a)-25(e) are schematic explanatory views showing the configuration of the cooling duct portion for explaining the second method for adjusting the sound-absorption frequency of the noise suppressor of the present invention, FIG. 25(a) showing a perspective view of the cooling duct portion, FIG. 25(b) showing a sectional view of FIG. 25(a), FIG. 25(c) showing a perspective view for explaining the exchange of duct shells, FIG. 25(d) showing a perspective view of the cooling duct portion after exchange of the duct shell, and FIG. 25(e) showing a sectional view of FIG. 25(d).

In the second sound-absorption frequency adjustment method, of the muffler formed inside the cooling duct in the noise suppressor of the present invention, the wall parts that make up the air chamber may be of a configuration that allows exchange. For example, in FIG. 25, first duct shell 69a (wall part) having a fan-shaped cylindrical shape that forms cavity volume $V_{c4}$ (air chamber) in Helmholtz resonator 67b used in the first embodiment may be exchanged for second duct shell 69b having a long rectangular block shape that forms a different cavity volume $V_{c5}$, whereby the resonance frequency of the Helmholtz resonator can be freely altered based on equation (1) while sharing the reflection plate without alteration.

In this adjustment method, explanation has regarded a case in which a Helmholtz resonator may be employed for the muffler provided in the cooling duct. However, it will be clear from equation (2) or equation (3) that determine the sound-absorption frequencies, the same effect may be obtained for a case in which a panel sound absorber or membrane sound absorber is employed.

Figure 26A:
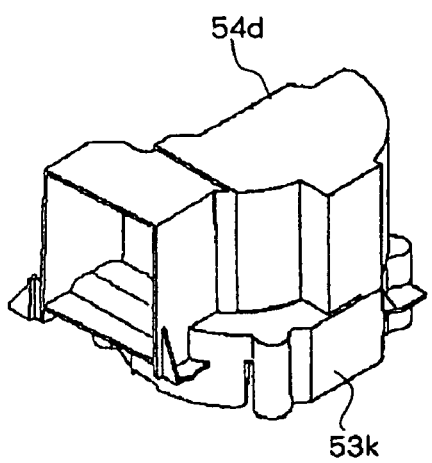
FIGS. 26(a)-26(c) are schematic explanatory views showing the configuration of the cooling duct portion for explaining an example of application of the second method for adjusting the sound-absorbing frequency of the noise suppressor of the present invention, FIG. 26(a) showing a perspective view of the cooling duct portion, FIG. 26(b) showing a perspective view of the state in which the muffler has been removed from the cooling duct, and FIG. 26(c) showing a rear perspective view of the muffler.
Figure 26B:
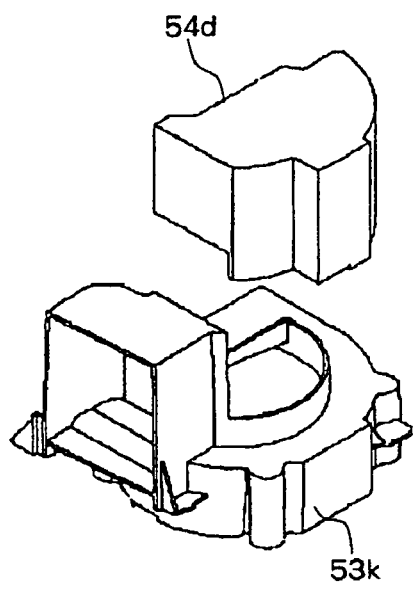
Figure 26C:
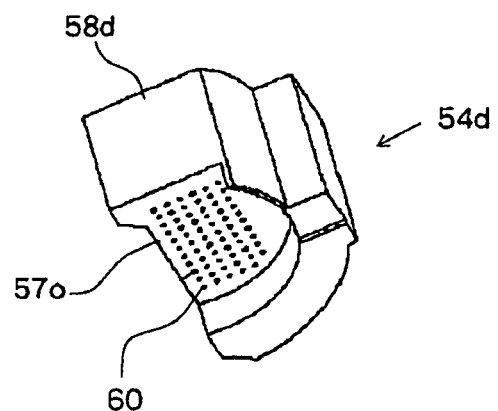

Explanation next regards an example of the application of the second sound-absorption frequency adjustment method. FIGS. 26(a)-26(c) are schematic explanatory views showing the configuration of the cooling duct portion for explaining the example of application of the second method for adjusting the sound-absorption frequency of the noise suppressor of the present invention, FIG. 26(a) showing a perspective view of the cooling duct portion, FIG. 26(b) showing a perspective view of the state in which the muffler has been removed from the cooling duct, and FIG. 26(c) showing a rear perspective view of the noise suppressor.

In the example of the application of the second sound-absorption frequency adjustment method, the muffler 54d (e.g., the entire muffler 54d) that includes the reflection plate, the wall part, and the air chamber can be exchanged as shown in FIG. 26, in contrast to the case of the second sound-absorption frequency adjustment method shown in FIG. 25 in which only a wall part was exchanged. By means of this method, the same effect can be obtained as in the second sound-absorption frequency adjustment method, but in addition, exchange can be realized simultaneously with a construction also having a different reflection plate 57c.

Figure 27A:
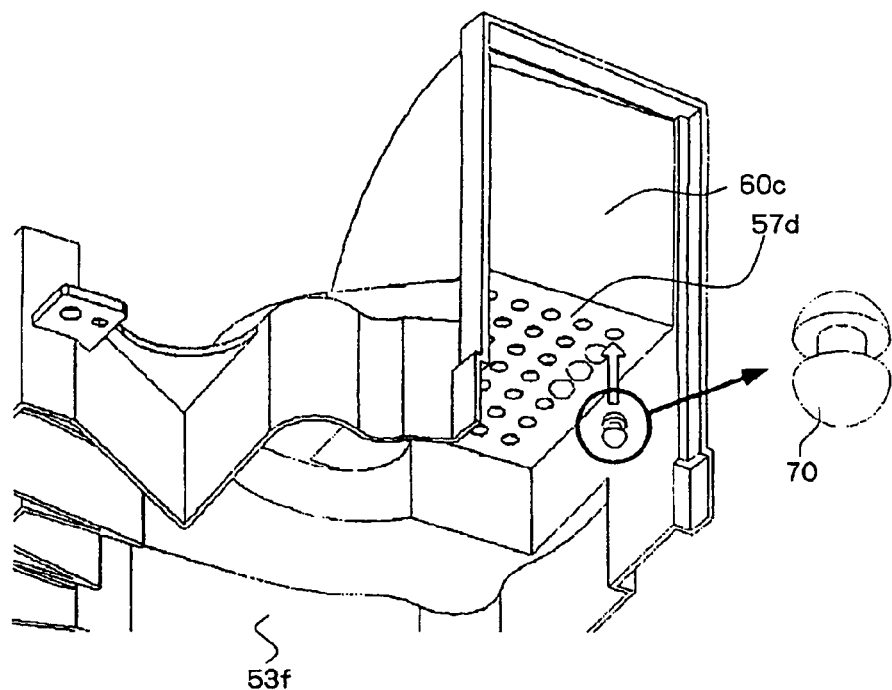
FIGS. 27(a) and 27(b) are schematic explanatory views showing the configuration of the cooling duct portion for explaining the third method for adjusting the sound-absorption frequency of the noise suppressor of the present invention, FIG. 27(a) showing a perspective view of the cooling duct portion and FIG. 27(b) showing a sectional view of FIG. 27(a)
Figure 27B:
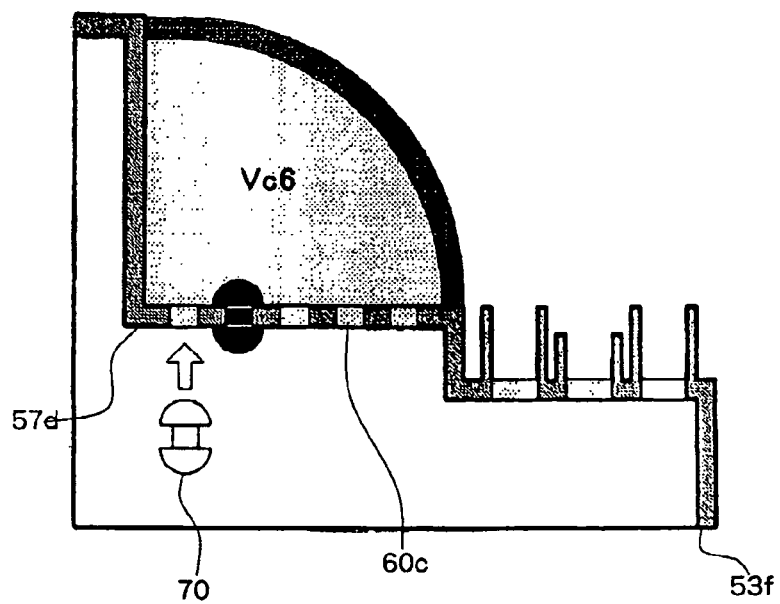

FIGS. 27(a) and 27(b) are schematic explanatory views showing the configuration of the cooling duct portion for explaining the third method of adjusting the sound-absorption frequency of the noise suppressor of the present invention, FIG. 27(a) showing a perspective view of the cooling duct portion, and FIG. 27(b) showing a sectional view of FIG. 27(a).

The third sound-absorption frequency adjustment method may be applied in particular to cases in which a Helmholtz resonator may be used in the muffler formed in the cooling duct in the noise suppressor of the present invention. That is, seal pins 70 that can be freely installed or removed are inserted to block a portion of the plurality of through-holes 60c provided in reflection plate 57d of cooling duct 53f. In this way, the number of through-holes that act as resonators can be adjusted to adjust the sound-absorption frequency.

In this case, the number of through-holes can be adjusted only by reduction, and the resonance frequency can thereby be altered only to a lower range. However, if the through-hole diameters and neck portion lengths (thickness of the reflection plates) are made uniform, common seal pins can be used to adjust a wide variety of noise suppressors.

Figure 28A:
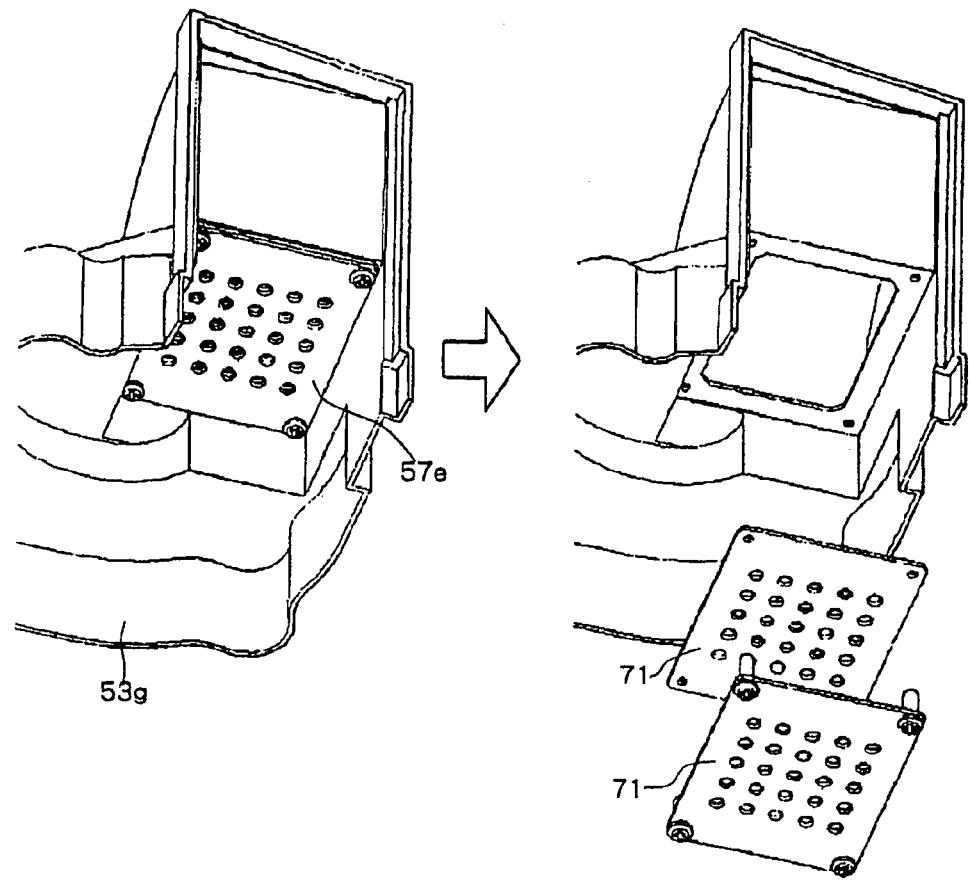
FIGS. 28(a) and 28(b) are schematic explanatory views showing the configuration of the cooling duct portion for explaining the fourth method for adjusting the sound-absorption frequency of the noise suppressor of the present invention, FIG. 28(a) showing a perspective view of the cooling duct portion, and FIG. 28(b) showing a sectional view of FIG. 28(a)
Figure 28B:
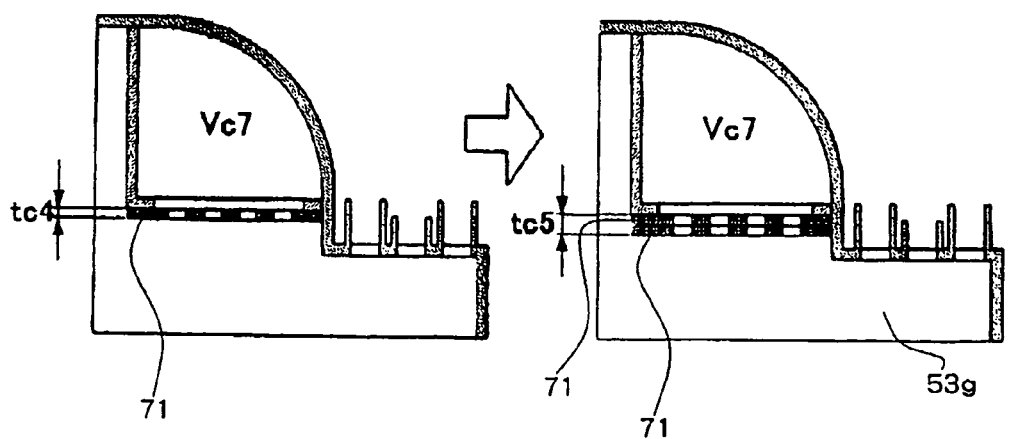

FIGS. 28(a) and 28(b) are schematic explanatory views showing the con figuration of the cooling duct portion for explaining the fourth method of the sound-absorption frequency of the noise suppressor of the present invention, FIG. 28(a) showing a perspective view of the cooling duct portion, an d FIG. 28(b) showing a sectional view of FIG. 28(a).

The fourth sound-absorption frequency adjustment method in the noise suppressor of the present invention may be applied particularly to examples of mufflers that are formed in the cooling duct that similarly use Helmholtz resonators. That is, reflection plate 57e provided with a sound-absorbing part having a plurality of through-holes of cooling duct 53g may be set to be exchangeable as in the first sound-absorption frequency adjustment method, the length of the neck portion of holes being open to alteration ($t_{c4} \Rightarrow t_{c5}$) by stacking and attaching a plurality of common plates 71 having the same through-hole diameter and the same number of through-holes, thus enabling free adjustment of the resonance frequency based on equation (1).

Figure 29A:
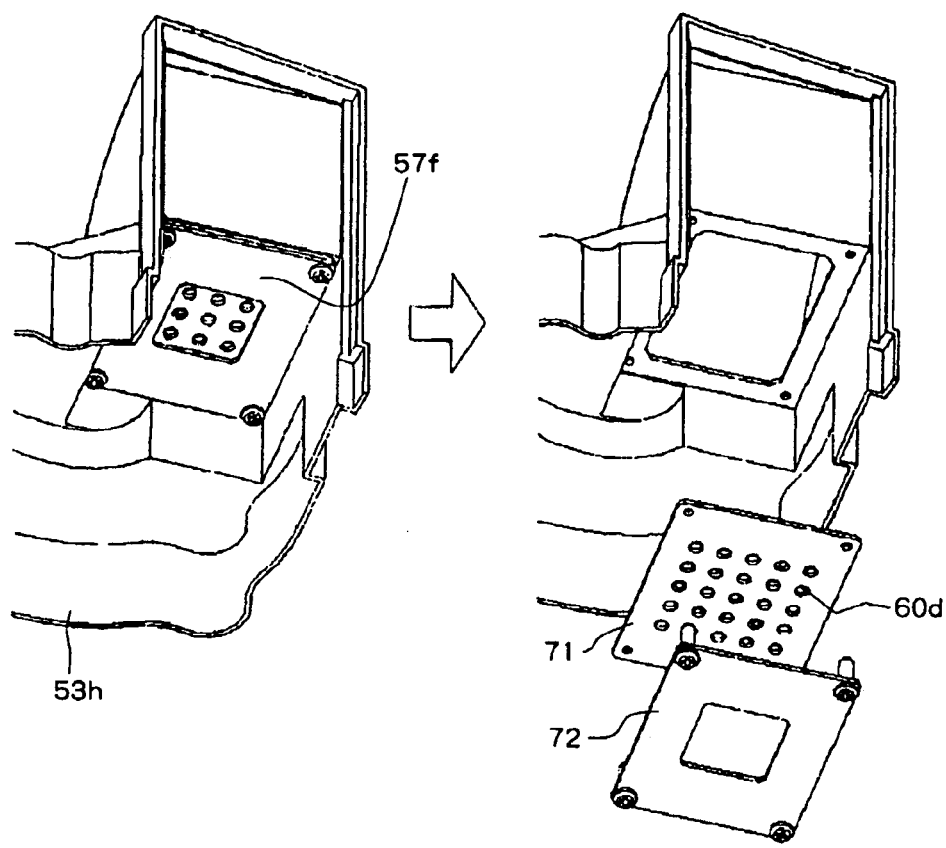
FIGS. 29(a) and 29(b) are schematic explanatory views showing the configuration of the cooling duct portion for explaining the fifth method for adjusting the sound-absorption frequency of the noise suppressor of the present invention, FIG. 29(a) showing a perspective view of the cooling duct portion, and FIG. 29(b) showing a sectional view of FIG. 29(a)
Figure 29B:
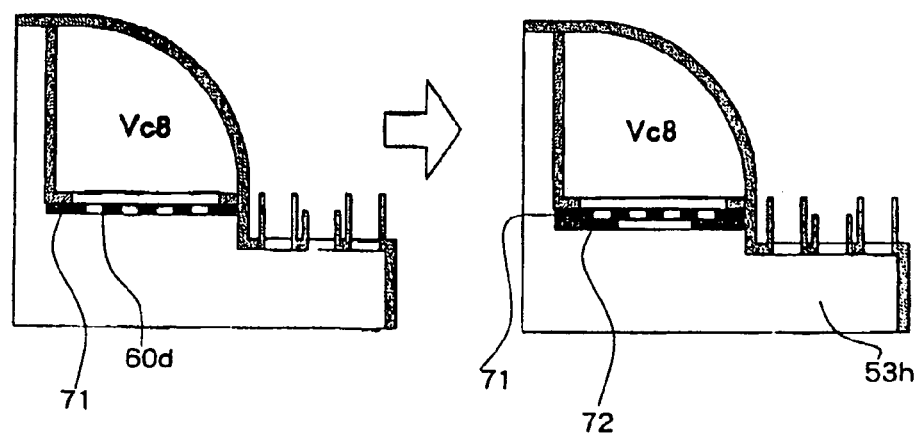

FIGS. 29(a) and 29(b) are schematic explanatory views showing the configuration of the cooling duct portion for explaining the fifth method of adjusting the sound-absorption frequency of the noise suppressor of the present invention, FIG. 29(a) showing a perspective view of the cooling duct portion, and FIG. 29(b) showing a sectional view of FIG. 29(a).

The fifth sound-absorption frequency adjustment method is again applied to cases of noise suppressors formed in the cooling duct that employ Helmholtz resonators. That is, a portion of the plurality of through-holes 60d provided in reflection plate 57f of cooling duct 53h may be blocked by overlaying mask plate 72, whereby the number of through-holes that act as resonators may be adjusted and the sound-absorption frequency accordingly adjusted.

In this case as well, adjustment can be realized by reducing (e.g., only by reducing) the number of through-holes, as in the third sound-absorption frequency adjustment method, and the resonance frequency therefore can be shifted lower frequency (e.g., can only be shifted lower frequency). However, when the degree of adjustment is great, a batch alteration may be possible and more convenient than applying seal pins.

Methods for broadening the range of sound-absorption frequencies of the muffler provided in the cooling duct and thus raising the noise suppression effect are next introduced. These control methods provide a means for further decreasing the "overall value" of fan noise by blunting the noise absorption characteristic of the noise suppressor that is provided and broadening the bandwidth over which the sound reduction effect extends.

Figure 30A:
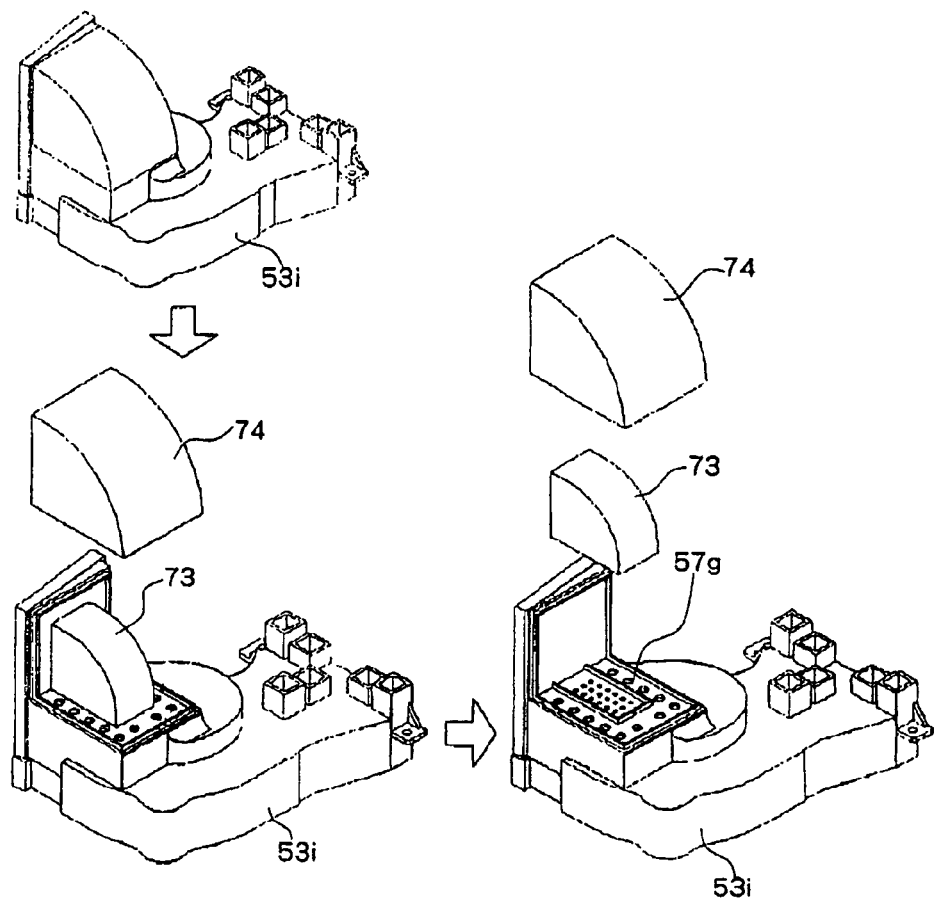
FIGS. 30(a)-30(c) are schematic explanatory views showing the configuration of the cooling duct portion for explaining the first method of broadening the bandwidth of sound-absorption frequency of the noise suppressor of the present invention, FIG. 30(a) showing a perspective view of the cooling duct portion, FIG. 30(b) showing a sectional view of FIG. 30(a), and FIG. 30(c) showing a partial exploded top view.
Figures 30B, 30C:
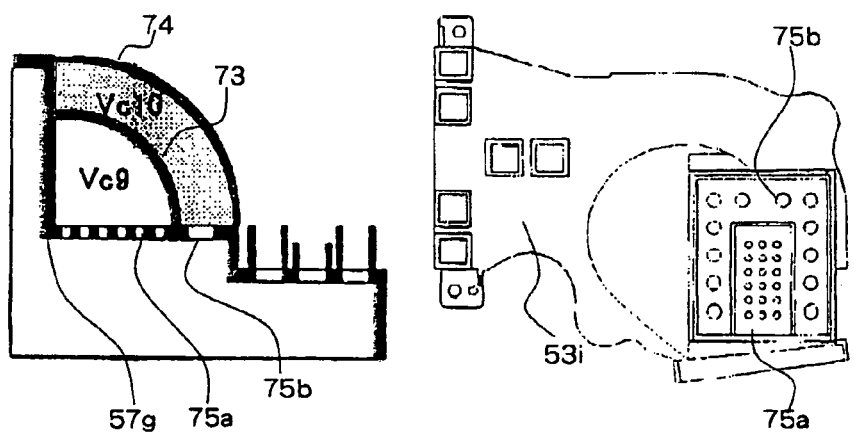

FIGS. 30(a)-30(c) are schematic explanatory views showing the configuration of the cooling duct portion for explaining the first method of broadening the bandwidth of sound-absorption frequencies of the noise suppressor of the present invention, FIG. 30(a) showing a perspective view of the cooling duct portion, FIG. 30(b) showing a sectional view of FIG. 30(a), and FIG. 30(c) showing a partial exploded top view.

In the first bandwidth broadening method, inner shell 73 and outer shell 74 may be used to form the air chamber of the muffler formed in cooling duct 53i as a two-layer construction in the noise suppressor of the present invention. Here, first through-hole part 75a and second through-hole part 75b are separately provided in the area that corresponds to each of inner cavity volume $V_{c9}$ and outer cavity volume $V_{c10}$ of reflection plate 57g that may be set substantially parallel to the intake plane of the cooling fan (not shown), whereby two Helmholtz resonators having different sound absorption characteristics (resonance frequencies) may be formed to have a separate sound-absorbing parts on the same reflection plate 57g.

In this case, the sound-absorption coefficient may decrease because the cavity volume of each resonator decreases, but by setting the through-hole diameters and numbers of through-holes such that each of the resonance frequencies are contiguous, the bandwidth produced by the resonance action can be broadened.

Although the explanation here regards a case of applying Helmholtz resonators in the muffler provided in the cooling duct, it will be clear that a similar configuration may be possible when applying a panel sound absorber or membrane sound absorber.

Figure 31C:
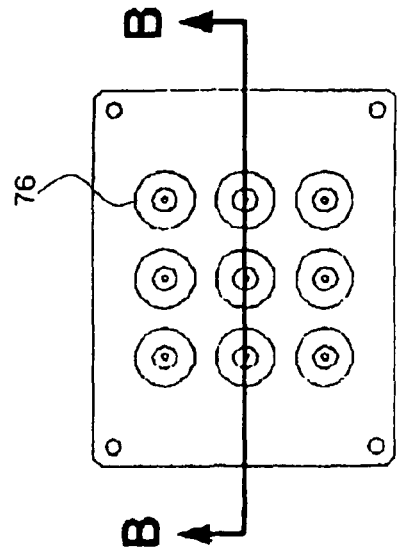
FIGS. 31(a)-31(d) are schematic explanatory views showing the configuration of the cooling duct portion for explaining the second method of broadening the bandwidth of sound-absorption frequency of the noise suppressor of the present invention, FIG. 31(a) showing a perspective view of the cooling duct portion, FIG. 31(b) showing a perspective view of the reflection plate, FIG. 31(c) showing a top view of the reflection plate, and FIG. 31(d) showing a sectional view of the B-B section of FIG. 31(c)
Figure 31D:
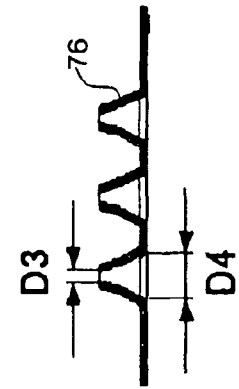
Figure 31A:
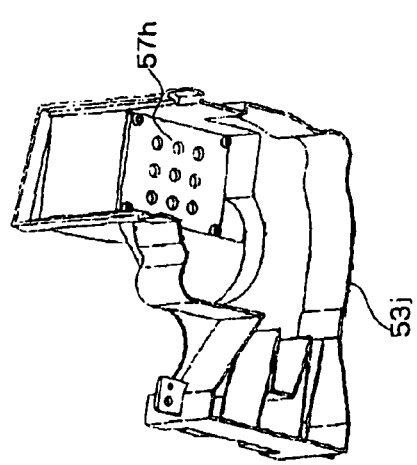
Figure 31B:
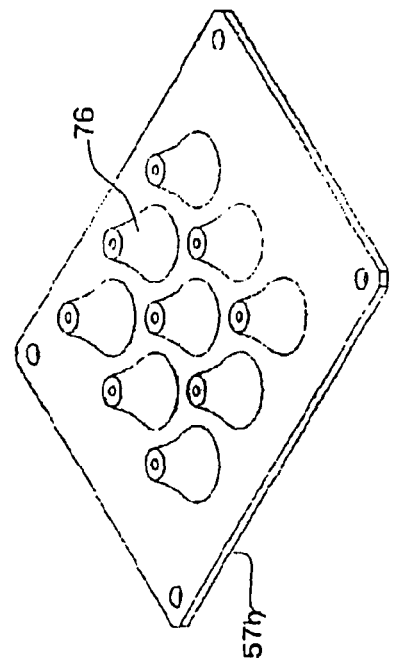

FIGS. 31(a)-31(d) are schematic explanatory views showing the configuration of the cooling duct portion for explaining the second method of broadening the sound-absorption frequency of the noise suppressor of the present invention, FIG. 31(a) being a perspective view of the cooling duct portion, FIG. 31(b) being a perspective view of the reflection plate, FIG. 31(c) being a top view of the reflection plate, and FIG. 31(d) being a sectional view of the B-B plane of FIG. 31(c).

The second bandwidth broadening method may apply in particular to the mufflers formed in cooling duct 53j that use Helmholtz resonators in the noise suppressor of the present invention. In the interest of simplification, the following explanation regards only the construction of a sound-absorbing plate, taking as an example the duct (e.g., FIG. 31(a)) of removable reflection plate (sound-absorbing plate) construction that was taken as an example in the first sound-absorption frequency adjustment method. However, the present invention is not limited to this duct construction.

In the second bandwidth broadening method, the through-hole parts formed in reflection plate 57h may include funnel-shaped protrusions 76 in which the hole diameter changes continuously from D3 to D4, as shown in FIG. 31(d), whereby the resonance phenomenon relaxes and spreads to the neighboring bandwidth due to the continuous change of diameter of the through-holes, and the resonance frequency determined by equation (1) may be thus blunted. Thus, although the sound-absorbing effect decreases, the bandwidth of sound-absorption frequencies may be broadened, thereby enabling a reduction of the "overall value" of fan noise.

Figure 32A:
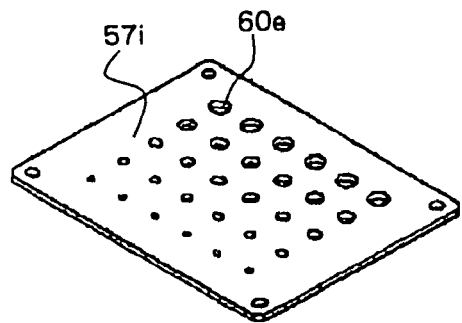
FIGS. 32(a) and 32(b) are schematic views showing the shape of the sound-absorbing plate for explaining the third method of broadening the bandwidth of sound-absorption frequencies of the noise suppressor of the present invention, FIG. 32(a) showing a perspective view, and FIG. 32(b) showing a top view.
Figure 32B:
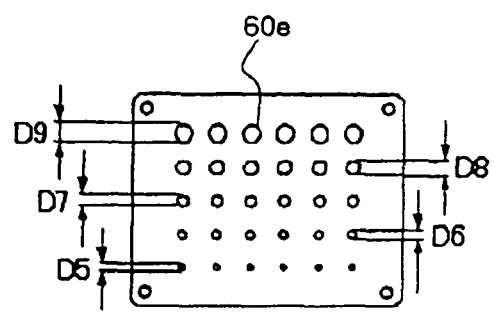

FIGS. 32(a)-32(b) are schematic views showing the form of the sound-absorbing plate for explaining the third method of broadening the sound-absorption frequencies of the noise suppressor of the present invention, FIG. 32(a) being a perspective view, and FIG. 32(b) being a top view. The third bandwidth broadening method is particularly applied to cases in which a Helmholtz resonator may be employed in the muffler.

In the third bandwidth broadening method, the hole diameter of each of the plurality of through-holes 60e formed in reflection plate 57i may be set to change continuously (D5<D6<D7<D8<D9) as shown in FIG. 32(b). The resonance phenomenon resulting from the differences of through-hole diameter may relax and extend over the surrounding bandwidth as in the second bandwidth broadening method, whereby the bandwidth of the sound-absorption frequency can be broadened in exchange for a decrease in the sound absorption effect.

Figure 33A:
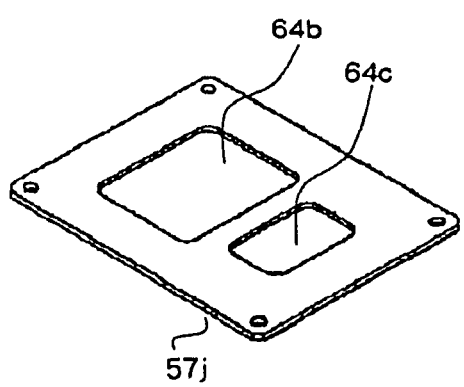
FIGS. 33(a)-33(c) are schematic views showing the shape of the sound-absorbing plate for explaining the fourth method of broadening the bandwidth of the sound-absorption frequency of the noise suppressor of the present invention, FIG. 33(a) showing a perspective view, FIG. 33(b) showing a top view, and FIG. 33(c) showing a sectional view.
Figure 33B:
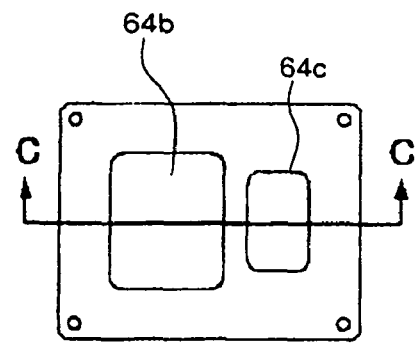
Figure 33C:
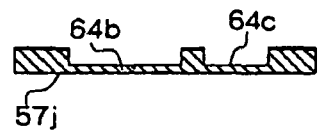

FIGS. 33(a)-33(c) are schematic views showing the form of the sound-absorbing plate for explaining the fourth method of broadening the bandwidth of sound-absorption frequencies of the noise suppressor of the present invention, FIG. 33(a) being a perspective view, FIG. 33(b) being a top view, and FIG. 33(c) being a sectional view. The fourth bandwidth broadening method may apply particularly to cases in which a panel sound absorber may be employed in the muffler.

In the fourth bandwidth broadening method, a broadening of the bandwidth of the sound-absorption frequency can be achieved by providing thin region 64b and thin region 64c of two types in reflection plate 57j and designing the stiffness of the thin regions (for example, thickness/area) such that the panel natural frequencies of the thin regions may be contiguous to each other.

Figure 34C:
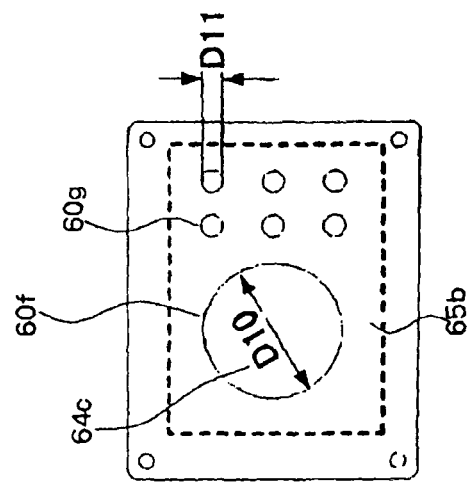
FIGS. 34(a)-34(c) are schematic explanatory views showing the configuration of the cooling duct portion for explaining the fifth method of broadening the bandwidth of the sound-absorption frequency of the noise suppress or of the present invention, FIG. 34(a) showing a perspective view of the reflection plate as seen from above, FIG. 34(b) showing a perspective view of the reflection plate as seen from below, and FIG. 34(c) showing a top view of the reflection plate.
Figure 34A:
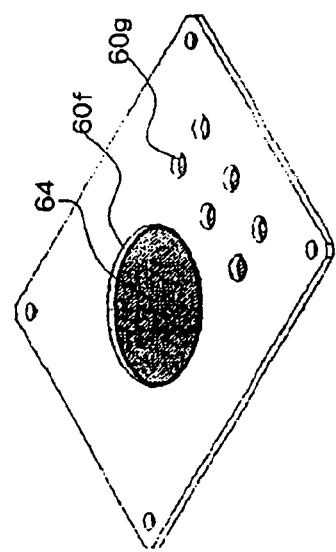
Figure 34B:
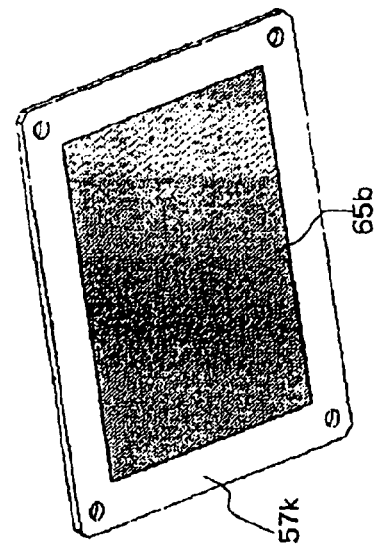

FIG. 34(a)-34(c) are schematic explanatory views showing the configuration of the cooling duct portion for explaining the fifth method of broadening the bandwidth of the sound-absorption frequency of the noise suppressor of the present invention, FIG. 34(a) showing a perspective view of reflection plate as seen from above, FIG. 34(b) showing a perspective view of the reflection plate as seen from below, and FIG.

34(c) showing a top view of the reflection plate. The fifth bandwidth broadening method applies particularly to cases in which a membrane sound absorber may be employed in the muffler.

In the fifth bandwidth broadening method, through-holes 60f and 60g having hole diameters of two types (D10 and D11) may be provided in reflection plate 57k, and sheet material 65b that covers the entire structure may be applied to reflection plate 57k. In this case as well, a broadening of the bandwidth of the sound-absorption frequency can be achieved by designing the stiffness of the membrane (for example, through-hole diameter/through-hole number) such that the membrane natural frequencies of through-hole 60f and through-holes 60g may be contiguous to each other.

FIGS. 35(a)-35(c) are schematic explanatory views showing the configuration of the cooling duct portion for explaining the sixth method of broadening the bandwidth of sound-absorption frequency of the noise suppressor of the present invention, FIG. 35(a) showing a perspective view, FIG. 35(b) showing a top view, and FIG. 35(c) showing a sectional view.

The sixth bandwidth broadening method may achieve a broadening of the bandwidth of sound-absorption frequency by setting mufflers of two different sound-absorbing principles, i.e., a Helmholtz resonator and a panel sound absorber, in the muffler formed in the cooling duct, setting the sound-absorbing parts of each muffler in reflection plate 57l that may be set substantially parallel to the intake plane of the cooling fan, and then adjusting the form (thin region panel thickness/area) of thin region 64d that may be the panel vibration part, and the form (through-hole diameter/through-hole number) of through-holes 60h that may be the resonator sound-absorbing parts such that the sound-absorption frequencies of each may be contiguous to each other.

Figure 36C:
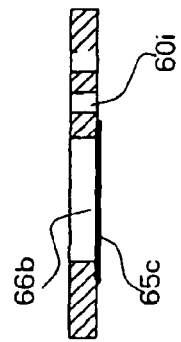
FIGS. 36(a)-36(d) is a schematic explanatory view showing the configuration of the cooling duct portion for explaining the seventh method of broadening the bandwidth of the sound-absorption frequency of the noise suppressor of the present invention, FIG. 36(a) showing a perspective view of the reflection plate as seen from above, FIG. 36(b) showing a perspective view of the reflection plate as seen from below, FIG. 36(c) showing a top view of the reflection plate, and FIG. 36(d) showing a sectional view.
Figure 36D:
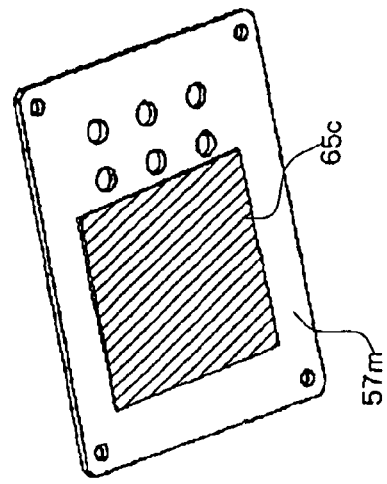
Figure 36A:
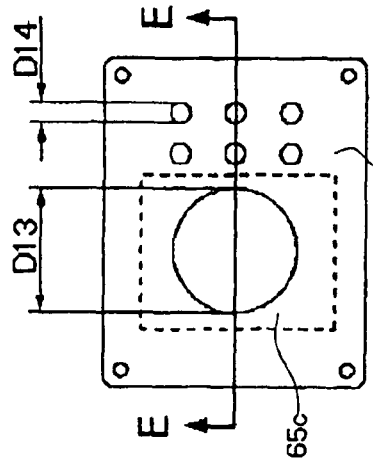
Figure 36B:
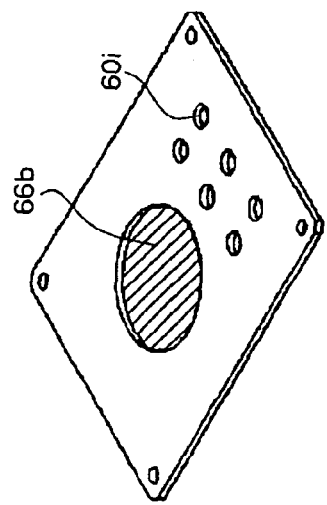

FIGS. 36(a)-36(d) are schematic explanatory views showing the configuration of the cooling duct portion for explaining the seventh method of broadening the bandwidth of sound-absorption frequency of the noise suppressor of the present invention, FIG. 36(a) being a perspective view of the reflection plate as seen from above, FIG. 36(b) being a perspective view of the reflection plate as seen from below, FIG. 36(c) being a top view of the reflection plate, and FIG. 36(d) being a sectional view.

The seventh bandwidth broadening method achieves a broadening of the bandwidth of the sound-absorption frequency by setting mufflers of two different sound-absorbing principles, e.g., a Helmholtz resonator and a membrane sound absorber, in the mufflers formed in the cooling duct, setting the sound-absorbing parts of each muffler in reflection plate 57m that may be set substantially parallel to the intake plane of the cooling fan, and adjusting the form (through-hole diameter/area) of membrane vibration part 66b in sheet material 65c and the form (through-hole diameter/through-hole number) of through-holes 60i that are the resonator sound absorbers such that the sound-absorption frequencies of each are contiguous to each other.

Figure 37C:
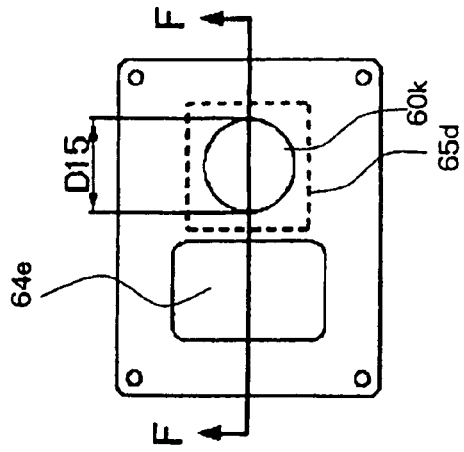
FIGS. 37(a)-37(d) are schematic explanatory views showing the configuration of the cooling duct portion for explaining the eighth method of broadening the bandwidth of the sound-absorption frequency of the noise suppressor of the present invention, FIG. 37(a) showing a perspective view of the reflection plate as seen from above, FIG. 37(b) showing a perspective view of the reflection plate as seen from below, FIG. 37(c) showing a top view of the reflection plate, and FIG. 37(d) showing a sectional view.
Figure 37D:
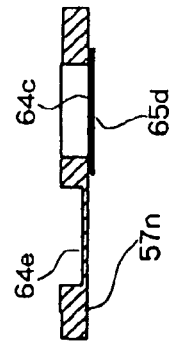
Figure 37A:
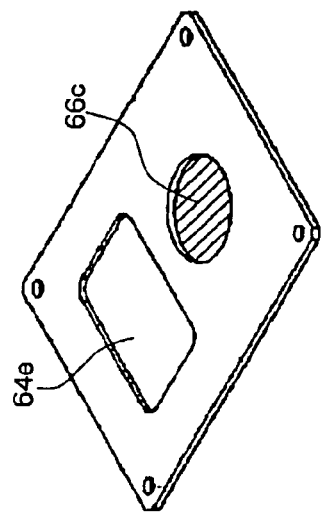
Figure 37B:
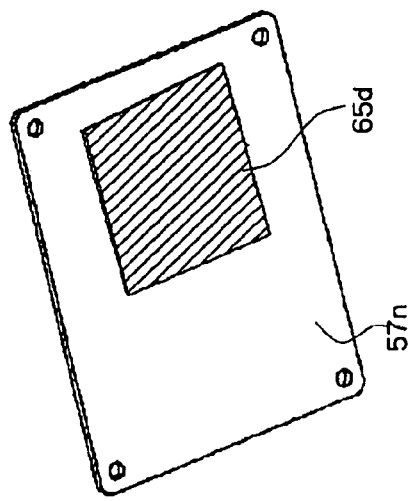

FIGS. 37(a)-37(d) are schematic explanatory views showing the configuration of the cooling duct portion for explaining the eighth method of broadening the bandwidth of sound-absorption frequency of the noise suppressor of the present invention, FIG. 37(a) showing a perspective view of the reflection plate as seen from above, FIG. 37(b) showing a perspective view of the reflection plate as seen from below, FIG. 37(c) showing a top view of the reflection plate, and FIG. 37(d) showing a sectional view.

The eighth bandwidth broadening method may achieve a broadening of the bandwidth of the sound-absorption frequency by setting mufflers of two types, e.g., a panel sound absorber and a membrane sound absorber, in the mufflers formed in the cooling duct, setting each of the sound-absorbing parts in reflection plate 57n that may be set substantially parallel to the intake surface of the cooling fan, and adjusting the form (thin region panel thickness/area) of thin region 64e that may be the panel vibration part and the form (through-hole diameter/surface area) of membrane vibration part 66c such that the sound-absorption frequencies of each may be contiguous to each other.

While the invention has been described in terms of preferred embodiments, those skilled in the art will recognize that the invention can be practiced with modification within the spirit and scope of the appended claims.

With its unique and novel features, the present invention provides a noise suppressor and method for effectively suppressing the noise of a cooling fan which may be used, for example, in a projection display device such as a liquid crystal projector.

While preferred embodiments of the present invention have been described using specific terms, such description is for illustrative purposes only, and it is to be understood that changes and variations may be made without departing from the spirit or scope of the following claims.

What is claimed is:

1. A noise suppression characteristics adjustment method, comprising:
    adjusting noise suppression characteristics of a noise suppressor, said noise suppressor comprising:
        a muffler comprising a reflection plate for reflecting sound from said cooling fan, said reflection plate being provided at a position in said cooling duct confronting an intake plane of said cooling fan and formed substantially parallel to the intake plane,
    wherein a sound-absorbing part of said muffler is provided on said reflection plate,
    wherein a distance d between said reflection plate and said intake plane is set such that $d < c/(2 \times f)$ where f is a sound-absorption frequency of said muffler and c is a speed of sound,
    wherein said muffler is located inside said cooling duct,
    wherein a through-hole is provided in said reflection plate,
    wherein said through hole comprises a plurality of through-holes, and
    wherein a resonance frequency of said resonator sound absorber is adjusted by blocking at least one of said plurality of through-holes.

2. A noise suppression characteristics adjustment method, comprising:
    adjusting noise suppression characteristics of a noise suppressor, said noise suppressor comprising:
        a muffler comprising a reflection plate for reflecting sound from said cooling fan, said reflection plate being provided at a position in said cooling duct confronting an intake plane of said cooling fan and formed substantially parallel to the intake plane; and
        an air chamber enclosed by said reflection plate and a wall part above said reflection plate,
    wherein a sound-absorbing part of said muffler is provided on said reflection plate,
    wherein a distance d between said reflection plate and said intake plane is set such that $d < c/(2 \times f)$ where f is a sound-absorption frequency of said muffler and c is a speed of sound,
    wherein said reflection plate comprises a configuration for allowing installation in and removal from said wall part, and wherein a resonance frequency of said resonator sound absorber is adjusted by stacking another reflection plate having the same through-hole characteristics as said reflection plate on said reflection plate.

3. A noise suppression characteristics adjustment method, comprising:
adjusting noise suppression characteristics of a noise suppressor, said noise suppressor comprising:
a muffler comprising a reflection plate for reflecting sound from said cooling fan, said reflection plate being provided at a position in said cooling duct such that said reflection plate faces an intake plane of said cooling fan, said reflection plate facing the intake plane of said cooling fan,
wherein said reflection plate comprises a plurality of resonance sound absorbers, each of said resonance sound absorbers comprising a through hole in said reflection plate.

4. The method of claim 3, further comprising placing said muffler inside said cooling duct.

5. The method of claim 4, further comprising providing a through-hole in said reflection plate.

6. The method of claim 5, further comprising providing said through hole so as to comprise a plurality of through-holes.

7. The method of claim 6, further comprising adjusting a resonance frequency of said resonator sound absorber by blocking at least one of said plurality of through-holes.

8. The method of claim 3, further comprising adjusting a resonance frequency of said resonator sound absorber by stacking another reflection plate, having same through-hole characteristics as said reflection plate, on said reflection plate.

9. The method of claim 3, further comprising adjusting the resonance frequency of said resonator sound absorber by blocking at least one of a plurality of through-holes provided in said reflection plate.

10. The method of claim 3, further comprising setting a distance d, between said reflection plate and said intake plane, such that $d<c/(2\times f)$, where f is a sound-absorption frequency of said muffler and c is a speed of sound.

* * * * *